(12) United States Patent
Kido et al.

(10) Patent No.: US 9,412,224 B2
(45) Date of Patent: Aug. 9, 2016

(54) MULTI-PLAYER GAMING MACHINE WITH LEVER-ACTUATED SPINNING WHEEL

(75) Inventors: Katsuhiro Kido, Tokyo (JP); Hiroki Munakata, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 254 days.

(21) Appl. No.: 13/186,779

(22) Filed: Jul. 20, 2011

(65) Prior Publication Data
US 2012/0115562 A1    May 10, 2012

(30) Foreign Application Priority Data
Nov. 10, 2010    (JP) ................................ 2010-252077

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2011.01) | |
| G07F 17/32 | (2006.01) | |
| G07F 17/34 | (2006.01) | |

(52) U.S. Cl.
CPC ........ G07F 17/3211 (2013.01); G07F 17/3262 (2013.01); G07F 17/3267 (2013.01); G07F 17/3276 (2013.01); G07F 17/34 (2013.01)

(58) Field of Classification Search
CPC ........... A63F 9/24; A63F 13/00; G06F 17/00; G06F 19/00
USPC ................. 463/17; 273/142 R; D21/374, 375
See application file for complete search history.

(56) References Cited

U.S. PATENT DOCUMENTS

| 4,373,727 A * | 2/1983 | Hooker et al. ............. 273/143 R |
| 6,093,101 A * | 7/2000 | Mourad .......................... 463/13 |
| 6,659,866 B2 | 12/2003 | Frost et al. |
| 2004/0072609 A1 * | 4/2004 | Ungaro et al. .................. 463/17 |
| 2004/0159590 A1 * | 8/2004 | Mothwurf ...................... 209/551 |
| 2007/0010312 A1 | 1/2007 | Ike et al. |

(Continued)

FOREIGN PATENT DOCUMENTS

| AU | 2005299238 B2 | 5/2006 |
| AU | 2005248935 B2 | 7/2006 |

(Continued)

OTHER PUBLICATIONS

Office Action dated Jun. 9, 2015 in the corresponding Japanese Patent Application No. 2010-252077.

*Primary Examiner* — James S McClellan
*Assistant Examiner* — Syvila Weatherford
(74) *Attorney, Agent, or Firm* — KMF Patent Services, PLLC; Kenneth M. Fagin, Esq.; S. Peter Konzel, Esq.

(57) ABSTRACT

A gaming machine of the present invention stores a bet area on which a bet is placed through a gaming terminal and a game value placed as the bet, determines a resulting symbol from a plurality of symbols, rotates the wheel based on an operation of the lever in one of the plurality of gaming terminals, whose lever has been activated, stops the rotation of the wheel so that the pointer points at a symbol arrangement area with the resulting symbol, and awards a payout based on the resulting symbol and the odds set for the bet area in which the bet is placed through the gaming terminal.

28 Claims, 22 Drawing Sheets

(56) References Cited

U.S. PATENT DOCUMENTS

| | | |
|---|---|---|
| 2007/0060262 A1 | 3/2007 | Kosaka et al. |
| 2008/0051168 A1* | 2/2008 | Kaminkow et al. ............ 463/16 |
| 2008/0102916 A1* | 5/2008 | Kovacs et al. .................. 463/16 |
| 2008/0113756 A1* | 5/2008 | Williams et al. ................ 463/20 |
| 2008/0176641 A1 | 7/2008 | Okada |
| 2008/0242393 A1 | 10/2008 | Kido |
| 2008/0248864 A1 | 10/2008 | Toyoda |
| 2008/0311979 A1* | 12/2008 | Walker et al. ................... 463/25 |
| 2009/0042653 A1 | 2/2009 | Hamada |
| 2009/0104964 A1* | 4/2009 | Snow .............................. 463/20 |
| 2009/0137310 A1* | 5/2009 | McAllister et al. ............ 463/20 |
| 2009/0191936 A1* | 7/2009 | Hawkins ............... G07F 17/32 463/16 |
| 2010/0075734 A1* | 3/2010 | Harari et al. .................... 463/17 |
| 2011/0059789 A1* | 3/2011 | Luciano ......................... 463/20 |

FOREIGN PATENT DOCUMENTS

| | | |
|---|---|---|
| JP | H05-003941 A | 1/1993 |
| JP | H11137768 | 5/1999 |
| JP | 2001-238994 | 9/2001 |
| JP | 2005-230290 A | 9/2005 |
| JP | 2007-451 | 1/2007 |
| JP | 2007-75593 | 3/2007 |
| JP | 2007-301103 | 11/2007 |
| JP | 2008-173456 | 7/2008 |
| JP | 2008-253442 | 10/2008 |
| JP | 2009-189546 | 8/2009 |
| WO | WO 2006/087987 | 8/2006 |

\* cited by examiner

FIG.14

BET INFORMATION MANAGING TABLE

| BET TYPE | BET AMOUNT |
|---|---|
| 1 | 5 |
| 3 | 25 |
| 6 | 0 |
| 12 | 0 |
| 25 | 0 |
| JOKER | 10 |
| LOGO | 0 |
| TOTAL BET AMOUNT | 40 |

FIG.15

LEVER OPERATION TIME TABLE

| LEVER OPERATION PERIOD | SPEED LEVEL |
|---|---|
| ~5msec | Slow |
| 6~9msec | Normal |
| 10msec~ | Fast |

FIG.16

STATION MANAGING TABLE

| STATION | BET TYPE | | | | | | | TOTAL BET AMOUNT | LEVER OPERATOR |
|---|---|---|---|---|---|---|---|---|---|
| | 1 | 3 | 6 | 12 | 25 | JOKER | LOGO | | |
| a | 5 | 25 | 0 | 0 | 0 | 10 | 0 | 40 | 0 |
| b | 10 | 10 | 5 | 0 | 0 | 0 | 0 | 25 | 0 |
| c | 0 | 15 | 0 | 25 | 10 | 0 | 5 | 55 | 1 |
| d | 0 | 40 | 0 | 0 | 0 | 0 | 0 | 40 | 0 |
| e | 30 | 0 | 0 | 0 | 0 | 5 | 10 | 45 | 0 |

FIG.17

WHEEL ROTATION SPEED TABLE

| SPEED LEVEL | INITIAL ROTATION SPEED |
|---|---|
| Slow | 8rpm |
|  | 9rpm |
| Normal | 10rpm |
|  | 11rpm |
| Fast | 12rpm |
|  | 13rpm |

FIG.18

WHEEL STOP-EFFECT PATTERN TABLE

| STOP POSITION | WHEEL STOP DETERMINATION |
|---|---|
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 1 |

FIG.19A

PAYOUT PATTERN TABLE

TYPE A

| SYMBOL | THE NUMBER OF SPOTS | PROBABILITY | ODDS | | PAYOUT RATE |
|---|---|---|---|---|---|
| 1 | 26 | 0.48148 | 2 | 1:1 | 96.296% |
| 3 | 13 | 0.24074 | 4 | 3:1 | 96.296% |
| 6 | 7 | 0.12963 | 7 | 6:1 | 90.741% |
| 12 | 4 | 0.07407 | 13 | 12:1 | 96.296% |
| 25 | 2 | 0.03704 | 26 | 25:1 | 96.296% |
| JOKER | 1 | 0.01852 | 53 | 52:1 | 98.148% |
| LOGO | 1 | 0.01852 | 53 | 52:1 | 98.148% |
| TOTAL PAYOUT RATE | | | | | 96.032% |

FIG.19B

TYPE B

| SYMBOL | THE NUMBER OF SPOTS | PROBABILITY | ODDS | | PAYOUT RATE |
|---|---|---|---|---|---|
| 1 | 26 | 0.48148 | 2 | 1:1 | 96.296% |
| 3 | 13 | 0.24074 | 4 | 3:1 | 96.296% |
| 6 | 7 | 0.12963 | 7 | 6:1 | 90.741% |
| 12 | 4 | 0.07407 | 13 | 12:1 | 96.296% |
| 25 | 2 | 0.03704 | 26 | 25:1 | 96.296% |
| JOKER | 1 | 0.01852 | 52 | 51:1 | 96.296% |
| LOGO | 1 | 0.01852 | 52 | 51:1 | 96.296% |
| TOTAL PAYOUT RATE | | | | | 95.503% |

FIG.19C

TYPE C

| SYMBOL | THE NUMBER OF SPOTS | PROBABILITY | ODDS | | PAYOUT RATE |
|---|---|---|---|---|---|
| 1 | 26 | 0.48148 | 2 | 1:1 | 96.296% |
| 3 | 13 | 0.24074 | 4 | 3:1 | 96.296% |
| 6 | 7 | 0.12963 | 7 | 6:1 | 90.741% |
| 12 | 4 | 0.07407 | 13 | 12:1 | 96.296% |
| 25 | 2 | 0.03704 | 26 | 25:1 | 96.296% |
| JOKER | 1 | 0.01852 | 51 | 50:1 | 94.444% |
| LOGO | 1 | 0.01852 | 51 | 50:1 | 94.444% |
| TOTAL PAYOUT RATE | | | | | 94.974% |

MULTI-PLAYER GAMING MACHINE WITH LEVER-ACTUATED SPINNING WHEEL

CROSS REFERENCE TO RELATED APPLICATION

The present application claims priority from Japanese Patent application No. 2010-252077 filed on Nov. 10, 2010, the entire disclosure of which is herein incorporated by reference.

BACKGROUND OF THE INVENTION

1. Field of the Invention

The present invention relates to a gaming machine which awards a payout, according to a resulting symbol on a wheel which rotates on the premise a game value is bet via a gaming terminal.

2. Description of Related Art

To date, there has been a gaming machine having a big wheel (roulette) which is rotated and stopped, and is visible to a plurality of players playing a game. Based on the resulting symbol on the wheel, the gaming machine awards a payout to a player.

For example, Australian patent No. 2005248935 discloses a gaming machine which rotates and stops a big wheel, awards a payout to the player based on the resulting symbol on the big wheel. This gaming machine further enables additional betting for a bonus feature, and awards an additional payout based on the winning result of the bonus feature.

Further, Australian patent No. 2005299238 discloses a gaming machine which rotates and stops a big wheel, awards a payout to the player based on the resulting symbol on the big wheel. This gaming machine further enables additional betting for a bonus feature, and displays a selection screen on the terminal of the player having placed a bet for the bonus feature upon winning the bonus feature. Then, an additional payout is awarded, based on the selection entered by the player.

Further, U.S. Pat. No. 6,659,866 discloses a gaming machine including a plurality of player terminals, a processor, and a dealer terminal, in which a manual roulette device is rotated and stopped and the processor directly awards a payout to a player terminal, based on the resulting symbol on the manual roulette device.

However, in the above traditional gaming machines, the big wheel used in a game and the manual roulette device are rotated manually by an operator and is stopped naturally. Therefore, effects to the game are limited and improvement of the entertainment characteristic has been difficult.

In view of the above problem, the present invention is made, and it is an object of the present invention to provide a gaming machine capable of achieving a high entertainment characteristic, in a game in which a wheel is rotated and stopped.

SUMMARY OF THE INVENTION

A gaming machine of the present invention includes: a wheel having a plurality of symbol arrangement areas in which a plurality of symbols are arranged on the same plane, respectively, the wheel being capable of rotating in such a manner that the symbols are visible; a pointer fixed separately from the rotatable wheel, which points one of the symbol arrangement areas; a plurality of gaming terminals each having a lever for starting rotation of the wheel, and a display for displaying a plurality of bet areas corresponding to the symbols, each gaming terminal structured to receive a bet of a game value on a bet area and to award a payout based on odds set for the bet area; a lever activating unit which activates the lever of any one of the gaming terminals, based on a predetermined condition; and a center controller, herein the center controller executes the processes of: (a1) storing a bet area on which a bet is placed and a game value placed as the bet in each gaming terminal, (a2) determining a resulting symbol from the plurality of symbols, (a3) rotating the wheel based on an operation of the lever in one of the plurality of gaming terminals, whose lever has been activated by the lever activating unit, (a4) stopping the wheel being rotated so that the pointer points at one of the symbol arrangement areas with the resulting symbol, (a5) awarding a payout based on the resulting symbol and the odds set for the bet area on which the bet is placed in the gaming terminal.

With the above structure, the wheel used in the game is automatically rotated or stopped by controlling the center controller. Thus, unlike a simple roulette game, various effects can be provided to the game, and the entertainment characteristic of the game is improved. The wheel used in the game is also rotatable by having the player operate the lever provided to the gaming terminal. Since the game can be started by a hand of the player, the player may feel more involved in the game and become more enthusiastic about the game. Further, since only the player of one gaming terminal among the plurality of gaming terminals is able to operate the lever, the player who can operate the lever feels he/she is more advantaged than the other players. This makes the operation of the lever very attractive to the players, and as a result, the entertainment characteristic of the game is improved.

Further, the gaming machine of the present invention may be adapted so that the center controller compares game values bet by the gaming terminals, respectively; controls the lever activating unit to activate the lever of a gaming terminal having bet the greatest game value among the plurality of gaming terminals; and rotates the wheel based on the operation of the lever having been activated.

With the structure, the player tries to bet more than the others to operate the lever which rotates the wheel. This contributes to heating up the game, and further improves the entertainment characteristic of the game.

Further, the gaming machine of the present invention may be adapted so that the center controller controls the lever activating unit to activate the lever of a gaming terminal determined among the plurality of gaming terminals, according to a predetermined sequence; and rotate the wheel based on the operation of the lever having been activated.

With the structure, the right to operate the lever for rotating the wheel is rotated to each gaming terminal. This contributes to the reduction of the possibility that the player trying to operate the lever while it is not his/her turn and consequently damaging or deteriorating the lever.

Further, the gaming machine of the present invention may be adapted so that the lever activating unit prohibits activation of the lever in a gaming terminal if the amount of game value bet from the gaming terminal falls short of a predetermined amount.

Further, with the structure, the lever cannot be operated if the amount of bet falls short of a predetermined amount of game value. This motivates the player to bet at least the predetermined amount of game value to operate the lever. As the result, the gaming machine has an improved cost performance. Further, since the player who has not yet bet the predetermined amount of game value is not able to operate the lever, the right for operating the lever will not be given to a vacant gaming terminal, nor will it be given to the player who has not yet participated into the game.

Further, the gaming machine of the present invention may be adapted so that each of the gaming terminals has an operation period measurement device which measures the operation period of the lever; and the center controller stores the operation period of the lever measured by the operation period measurement device, and rotates the wheel at a rotation speed corresponding to the operation period, based on an operation of the lever in one of the plurality of gaming terminals, whose lever has been activated by the lever activating unit.

With the above structure, the wheel rotates at a rotation speed corresponding to the operation period of the lever for rotating the wheel. Therefore, the rotation speed of the wheel is not the same every time the wheel is rotated. When compared with a gaming machine in which the wheel rotates in the same manner all the time, the above gaming machine provides an improved entertainment characteristic which more likely keeps the enthusiasm of the players to the game, without causing them to get board of the game.

Further, a gaming machine of the present invention includes: a wheel having a plurality of symbol arrangement areas in which a plurality of symbols are arranged on the same plane, respectively, the wheel being capable of rotating in such a manner that the symbols are visible; a pointer fixed separately from the rotatable wheel, which points one of the symbol arrangement areas; a motor which rotates the wheel; a plurality of gaming terminals each having a lever for starting rotation of the wheel, and a display for displaying a plurality of bet areas corresponding to the symbols, each gaming terminal structured to receive a bet of a game value on a bet area and to award a payout based on odds set for the bet area; a lever activating unit which activates the lever of any one of the gaming terminals, based on a predetermined condition; a rotation speed data storage which stores therein rotation speed data regulating the rotation speed of the wheel relative to the rotation angle of the wheel; a center controller, herein the center controller executes the processes of: (b1) storing a bet area on which a bet is placed and a game value placed as the bet in each gaming terminal, (b2) determining a resulting symbol from the plurality of symbols, (b3) rotating the wheel based on an operation of the lever in one of the plurality of gaming terminals, whose lever has been activated by the lever activating unit, (b4) controlling the motor to change the rotation speed of the wheel based on the rotation speed data stored in the rotation speed data storage; (b5) stopping the wheel being rotated so that the pointer points at one of the symbol arrangement areas with the resulting symbol, (b6) awarding a payout based on the resulting symbol and the odds set for the bet area on which the bet is placed in the gaming terminal.

With the above structure, the wheel used in the game is automatically rotated or stopped by controlling the center controller. Thus, unlike a simple roulette game, various effects can be provided to the game, and the entertainment characteristic of the game is improved. Further, the wheel used in the game is also rotatable by having the player operate the lever provided to the gaming terminal. Since the game can be started by a hand of the player, the player may feel more involved in the game and become more enthusiastic about the game. Further, since only the player of one gaming terminal among the plurality of gaming terminals is able to operate the lever, the player who can operate the lever feels he/she is more advantaged than the other players. This makes the operation of the lever very attractive to the players, and as a result, the entertainment characteristic of the game is improved. Further, the rotation speed of the wheel can be varied by controlling the motor with the center controller. Therefore, for example, the wheel can be rotated at a desirable rotation speed, and stopped at a desirable position. This enables wider variation of the game, and further improves the entertainment characteristic.

Further, the gaming machine of the present invention may be adapted so that the rotation speed data regulates the rotation speed so that the rotation is accelerated or decelerated relative to the rotation angle within a predetermined period; and the center controller controls the motor to accelerate or decelerate the rotation of the wheel based on the rotation speed data stored in the rotation speed data storage.

With the structure, the rotation speed of the wheel is accelerated and decelerated within a predetermined period. When compared with a gaming machine in which the wheel rotates at a constant speed, the above structure provides an improved entertainment characteristic that more likely keeps the enthusiasm of the players to the game, without causing them to get board of the game.

Further, the gaming machine of the present invention may be adapted so that the center controller controls the motor to rapidly decelerate the rotation of the wheel and then gradually decelerate the rotation of the wheel to stop the wheel, based on the rotation speed data stored in the rotation speed data storage.

With the structure, the rotating wheel is rapidly decelerated once, and then is gradually decelerated and stopped. Thus, even when a large wheel which generates a large inertia is adopted, the wheel is gradually stopped in a short period. This improves the operation rate of the gaming machine.

Further, a gaming machine of the present invention includes: a wheel having a plurality of symbol arrangement areas in which a plurality of symbols are arranged on the same plane, respectively, the wheel being capable of rotating in such a manner that the symbols are visible; a pointer fixed separately from the rotatable wheel, which points one of the symbol arrangement areas; a symbol lighting device which lights up the symbols; a plurality of gaming terminals each having a lever for starting rotation of the wheel, and a display for displaying a plurality of bet areas corresponding to the symbols, each gaming terminal structured to receive a bet of a game value on a bet area and to award a payout based on odds set for the bet area; a lever activating unit which activates the lever of any one of the gaming terminals, based on a predetermined condition; and a center controller, herein the center controller executes the processes of: (c1) storing a bet area on which a bet is placed and a game value placed as the bet in each gaming terminal, (c2) determining a resulting symbol from the plurality of symbols, (c3) rotating the wheel based on an operation of the lever in one of the plurality of gaming terminals, whose lever has been activated by the lever activating unit, and lighting up all the symbols by the symbol lighting device, (c4) stopping the wheel being rotated so that the pointer points at the symbol arrangement area with the resulting symbol, and lighting up only the resulting symbol by the symbol lighting device, and (c5) awarding a payout based on the resulting symbol and the odds set for the bet area on which the bet is placed in the gaming terminal.

With the above structure, the wheel used in the game is automatically rotated or stopped by controlling the center controller. Thus, unlike a simple roulette game, various effects can be provided to the game, and the entertainment characteristic of the game is improved. Further, the wheel used in the game is also rotatable by having the player operate the lever provided to the gaming terminal. Since the game can be started by a hand of the player, the player may feel more involved in the game and become more enthusiastic about the game. Further, since only the player of one gaming terminal among the plurality of gaming terminals is able to operate the lever, the player who can operate the lever feels he/she is more advantaged than the other players. This makes the operation of the lever very attractive to the players, and as a result, the entertainment characteristic of the game is improved. Further, it is possible to provide an effect that all the symbols are lighted up during the rotation of the wheel, and when the wheel stops and the resulting symbol is determined, only the resulting symbol is lighted up. This lighting effect enables the players to feel the excitement of the scene, and further improves the entertainment characteristic of the game.

Further, a gaming machine of the present invention includes: a wheel having a plurality of symbol arrangement areas in which a plurality of symbols are arranged on the same plane, respectively, the wheel being capable of rotating in such a manner that the symbols are visible; a pointer fixed separately from the rotatable wheel, which points one of the symbol arrangement areas; a plurality of gaming terminals each having a lever for starting rotation of the wheel, and a display for displaying a plurality of bet areas corresponding to the symbols, each gaming terminal structured to receive a bet of a game value on a bet area and to award a payout based on odds set for the bet area; a lever activating unit which activates the lever of any one of the gaming terminals, based on a predetermined condition; a rotation count table storage which stores a rotation count table regulating the number of rotations of the wheel; and a center controller, herein the center controller executes the processes of: (d1) storing a bet area on which a bet is placed and a game value placed as the bet in each gaming terminal, (d2) determining a resulting symbol from the plurality of symbols, (d3) rotating the wheel a certain number of times according to the rotation count table stored in the rotation count table storage, based on an operation of the lever in one of the plurality of gaming terminals, whose lever has been activated by the lever activating unit, (d4) stopping the wheel being rotated so that the pointer points at one of the symbol arrangement areas with the resulting symbol, and (d5) awarding a payout based on the resulting symbol and the odds set for the bet area on which the bet is placed in the gaming terminal.

With the above structure, the wheel used in the game is automatically rotated or stopped by controlling the center controller. Thus, unlike a simple roulette game, various effects can be provided to the game, and the entertainment characteristic of the game is improved. Further, the wheel used in the game is also rotatable by having the player operate the lever provided to the gaming terminal. Since the game can be started by a hand of the player, the player may feel more involved in the game and become more enthusiastic about the game. Further, since only the player of one gaming terminal among the plurality of gaming terminals is able to operate the lever, the player who can operate the lever feels he/she is more advantaged than the other players. This makes the operation of the lever very attractive to the players, and as a result, the entertainment characteristic of the game is improved. Further, it is possible to rotate the wheel a predetermined number of times. Therefore, for example, if the wheel needs to be rotated at least three times according to a national regulation, the wheel is stopped after the rotating at least three times, and if the wheel needs to be rotated at least twice, according to a national regulation, the wheel is stopped after rotating at least twice. As is understood from this, the number of rotations of the wheel is freely adjustable. Therefore, it is possible to speed up the game in some countries.

Further, a gaming machine of the present invention includes: a wheel having a plurality of symbol arrangement areas in which a plurality of symbols are arranged on the same plane, respectively, the wheel being capable of rotating in such a manner that the symbols are visible; a border provided between symbol arrangement areas adjacent to each other; a pointer fixed separately from the rotatable wheel, which points one of the symbol arrangement areas; a speaker which outputs a sound effect, a plurality of gaming terminals each having a lever for starting rotation of the wheel, and a display for displaying a plurality of bet areas corresponding to the symbols, each gaming terminal structured to receive a bet of a game value on a bet area and to award a payout based on odds set for the bet area; a lever activating unit which activates the lever of any one of the gaming terminals, based on a predetermined condition; and a center controller, herein the center controller executes the processes of: (e1) storing a bet area on which a bet is placed and a game value placed as the bet in each gaming terminal, (e2) determining a resulting symbol from the plurality of symbols, (e3) rotating the wheel based on an operation of the lever in one of the plurality of gaming terminals, whose lever has been activated by the lever activating unit, (e4) when the pointer passes the border, outputting a sound effect from the speaker based on the rotation angle of the wheel, (e5) stopping the wheel being rotated so that the pointer points at one of the symbol arrangement areas with the resulting symbol, (e6) awarding a payout based on the resulting symbol and the odds set for the bet area on which the bet is placed in the gaming terminal.

With the above structure, the wheel used in the game is automatically rotated or stopped by controlling the center controller. Thus, unlike a simple roulette game, various effects can be provided to the game, and the entertainment characteristic of the game is improved. Further, the wheel used in the game is also rotatable by having the player operate the lever provided to the gaming terminal. Since the game can be started by a hand of the player, the player may feel more involved in the game and become more enthusiastic about the game. Further, since only the player of one gaming terminal among the plurality of gaming terminals is able to operate the lever, the player who can operate the lever feels he/she is more advantaged than the other players. This makes the operation of the lever very attractive to the players, and as a result, the entertainment characteristic of the game is improved. Further, a sound effect is output from the speaker, based on the rotation angle of the wheel when the pointer passes a border. It is therefore possible to, for example, output a sound effect only when the pointer completely passes the border. This sound effect enables the players to feel the excitement of the scene, and further improves the entertainment characteristic of the game.

Further, a gaming machine of the present invention includes: a wheel having a plurality of symbol arrangement areas in which a plurality of symbols are arranged on the same plane, respectively, the wheel being capable of rotating in such a manner that the symbols are visible; a pointer fixed separately from the rotatable wheel, which points one of the symbol arrangement areas; a pointer lighting device which lights up the pointer, a plurality of gaming terminals each having a lever for starting rotation of the wheel, and a display for displaying a plurality of bet areas corresponding to the symbols, each gaming terminal structured to receive a bet of a game value on a bet area and to award a payout based on odds set for the bet area; a lever activating unit which activates the lever of any one of the gaming terminals, based on a predetermined condition; and a center controller, herein the center controller executes the processes of: (f1) storing a bet area on which a bet is placed and a game value placed as the bet in each gaming terminal, (f2) determining a resulting symbol from the plurality of symbols, (f3) rotating the wheel and lighting up the pointer by the pointer lighting device, based on an operation of the lever in one of the plurality of gaming terminals, whose lever has been activated by the lever activating unit, (f4) stopping the wheel being rotated so that the pointer points at one of the symbol arrangement areas with the resulting symbol, (f5) awarding a payout based on the resulting symbol and the odds set for the bet area on which the bet is placed in the gaming terminal.

With the above structure, the wheel used in the game is automatically rotated or stopped by controlling the center controller. Thus, unlike a simple roulette game, various effects can be provided to the game, and the entertainment characteristic of the game is improved. Further, the wheel used in the game is also rotatable by having the player operate the lever provided to the gaming terminal. Since the game can be started by a hand of the player, the player may feel more involved in the game and become more enthusiastic about the game. Further, since only the player of one gaming terminal among the plurality of gaming terminals is able to operate the lever, the player who can operate the lever feels he/she is more advantaged than the other players. This makes the operation of the lever very attractive to the players, and as a result, the entertainment characteristic of the game is improved. Further, the pointer is lighted up during the rotation of the wheel. It is therefore possible to provide the player with this light up effect, and the entertainment characteristic of the game is further improved. This light up effect further yields an advantageous effect that people can grasp the progression of the game from a far distance.

BRIEF DESCRIPTION OF THE DRAWINGS

FIG. 14 is an explanatory diagram showing a bet information managing table of the station related to the embodiment of the present invention.

FIG. 15 is an explanatory diagram showing a lever operation time table of the station related to the embodiment of the present invention.

FIG. 16 is an explanatory diagram showing a station managing table of the mass controller related to the embodiment of the present invention.

FIG. 17 is an explanatory diagram showing a wheel rotation speed table of the mass controller related to the embodiment of the present invention.

FIG. 18 is an explanatory diagram showing a wheel stop-effect pattern table of the mass controller related to the embodiment of the present invention.

FIG. 19A is an explanatory diagram showing a payout pattern table of type A of the mass controller related to the embodiment of the present invention.

FIG. 19B is an explanatory diagram showing a payout pattern table of type B of the mass controller related to the embodiment of the present invention.

FIG. 19C is an explanatory diagram showing a payout pattern table of type C of the mass controller related to the embodiment of the present invention.

DESCRIPTION OF THE PREFERRED EMBODIMENTS

The following describes a preferable embodiment of the present invention, with reference to attached drawings.

(Overview of the Gaming Machine)

Figure 1:
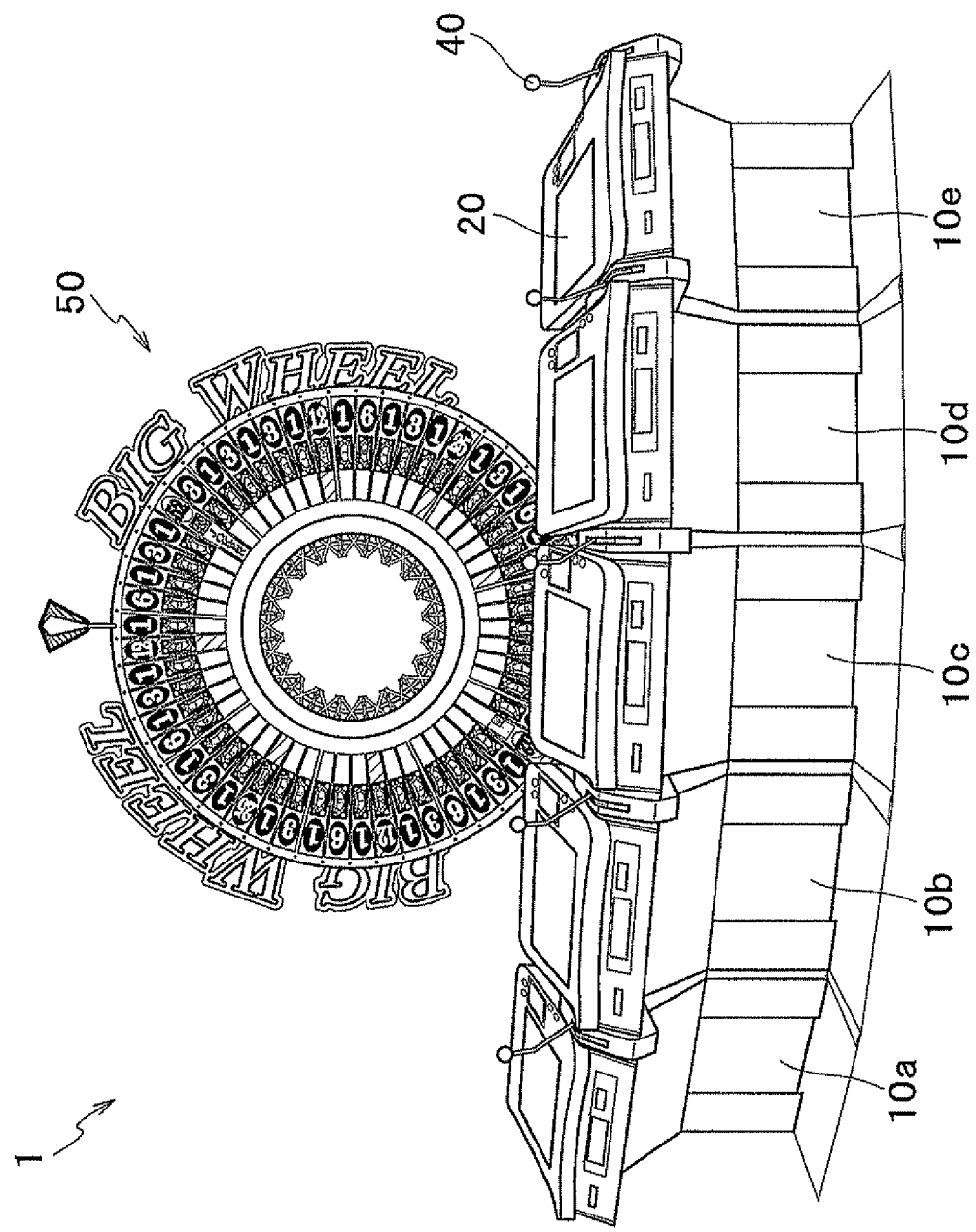
FIG. 1 is a diagram showing the entire gaming machine related to an embodiment of the present invention.
Figure 2:
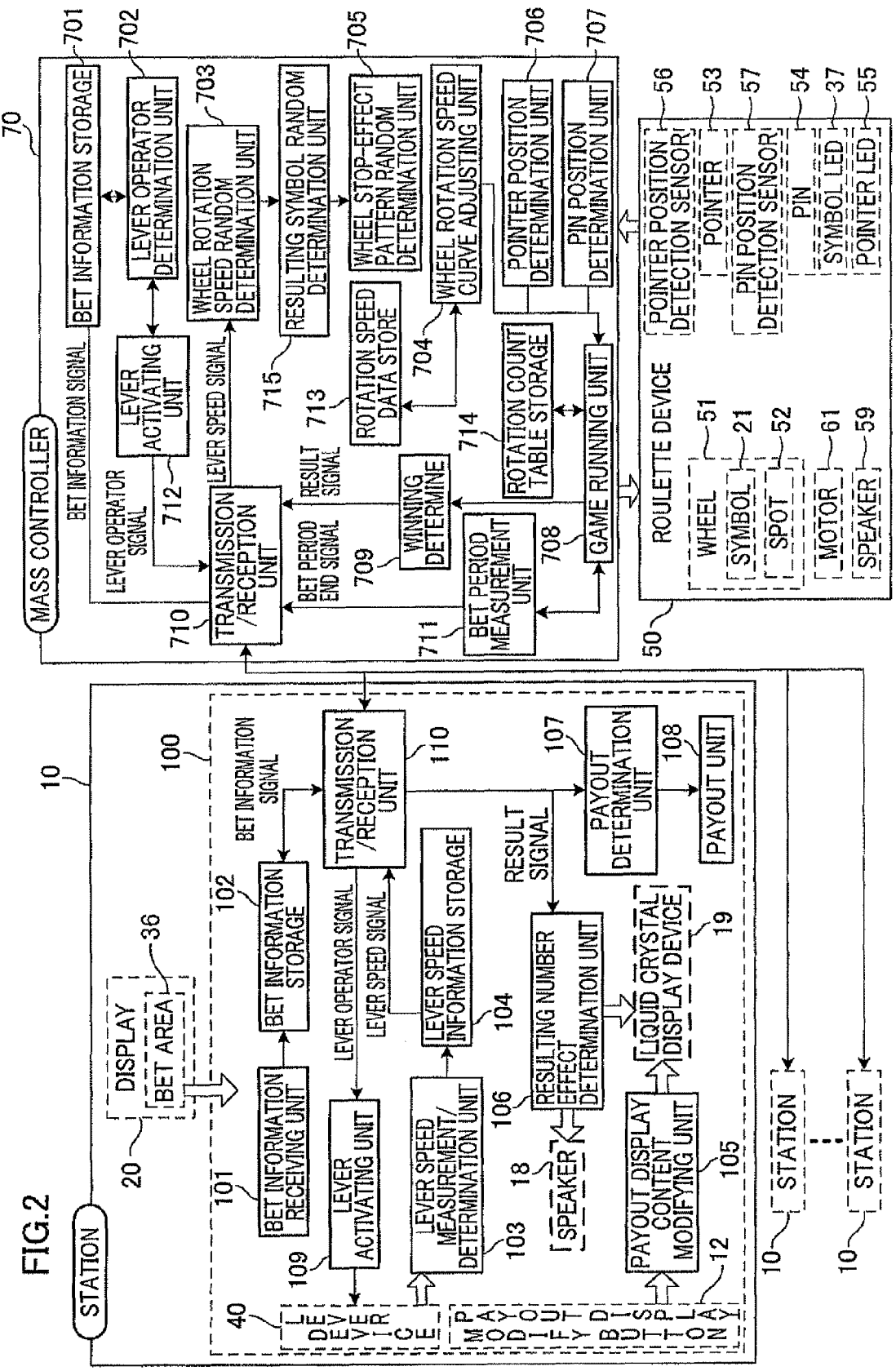
FIG. 2 is an explanatory diagram showing a function flow of the gaming machine related to the embodiment of the present invention.
Figure 3:
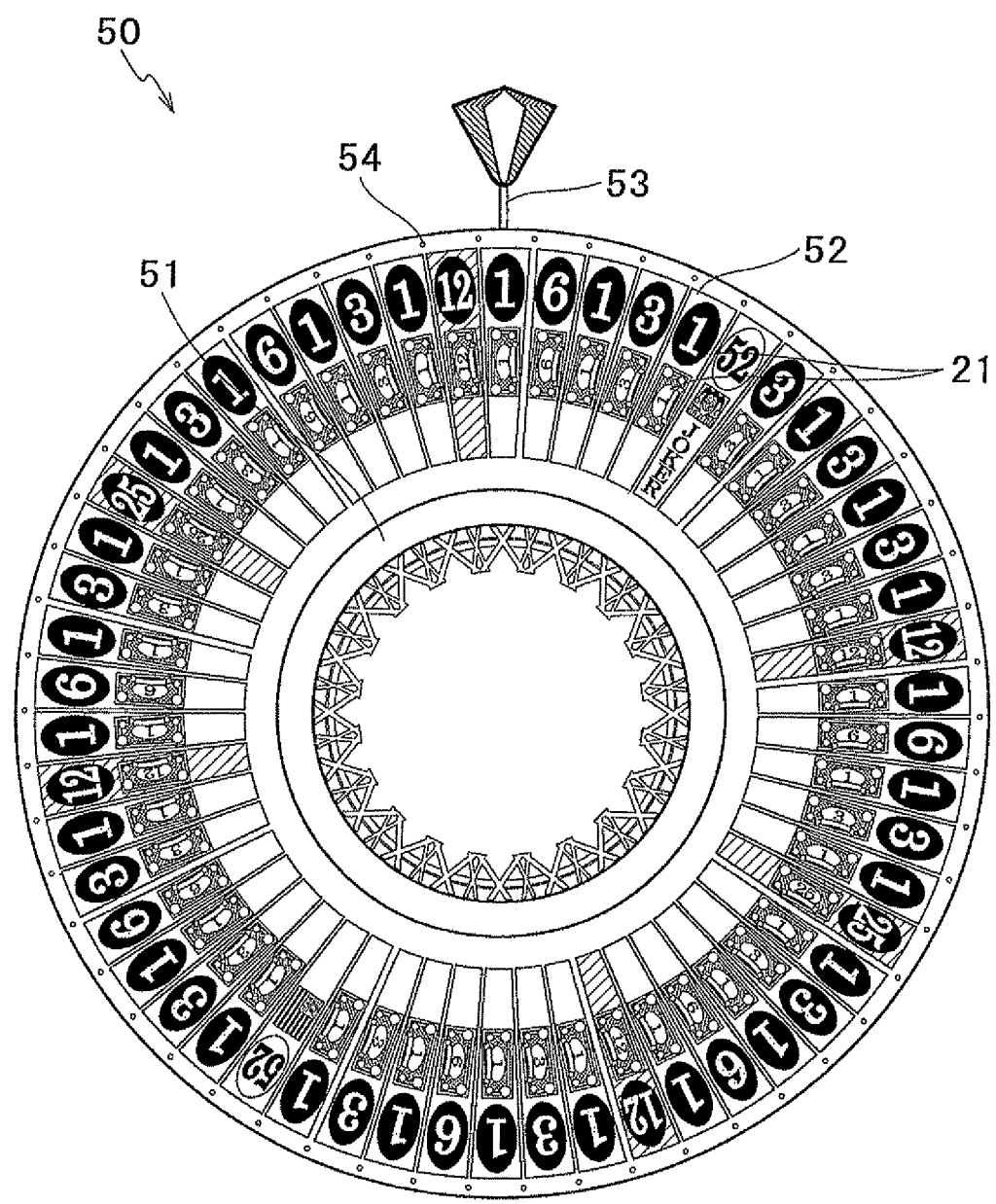
FIG. 3 is an explanatory diagram showing a roulette device of the gaming machine related to the embodiment of the present invention.

As shown in FIG. 1 to FIG. 3, a gaming machine 1 of the present embodiment includes: a wheel 51 having a plurality of spots 52 in which a plurality of symbols 21 are arranged on the same plane, respectively, the wheel being capable of rotating in such a manner that the symbols 21 are visible; a pointer 53 fixed apart from the rotatable wheel 51, which points one of the spots 52; a plurality of stations 10 (10*a*, 10*b*, 10*c*, 10*d*, 10*e*) each having a lever device 40 for starting rotation of the wheel 51, and a display 20 for displaying a plurality of bet areas 36 corresponding to the symbols 21, each station structured to receive a bet of a game value on a bet area 36 and to award a payout based on odds set for the bet area 36; lever activating units 109 and 712 which activate the lever device 40 of any of the stations 10, based on a predetermined condition; and a mass controller 70, wherein the mass controller 70 is programmed to execute the processes of: (a1) storing a bet area 36 on which a bet is placed and a game value placed as the bet in each station 10, (a2) determining a resulting symbol from the plurality of symbols 21, (a3) rotating the wheel 51 based on an operation of the lever device 40 in one of the plurality of stations 10, whose lever device 40 has been activated by the lever activating units 109 and 712, (a4) stopping the wheel 51 being rotated so that the pointer 53 points at one of the spots 52 with the resulting symbol 21, and (a5) awarding a payout based on the resulting symbol 21 and the odds set for the bet area 36 on which the bet is placed in the station 10.

Further, the mass controller 70 compares the game values bet by the stations 10 (10*a*, 10*b*, 10*c*, 10*d*, 10*e*), respectively; controls the lever activating units 109 and 712 to activate the lever of the station 10 having bet the greatest game value among the plurality of gaming terminals; and rotates the wheel 51 based on the operation of the lever device 40 having been activated.

Further, the mass controller 70 controls the lever activating units 109 and 712 to activate the lever device 40 of a station 10 determined among the plurality of the stations 10, according to a predetermined sequence; and rotates the wheel 51 based on the operation of the lever device 40 having been activated.

Further, the lever activating units 109 and 712 prohibit activation of the lever device 40 in a station 10 if the amount of game value bet from the station 10 falls short of a predetermined amount.

Further, each of the stations 10 has a lever speed measurement/determination unit 103 which measures the operation period of the lever device 40; and the mass controller 70 stores the operation period of the lever device 40 measured by the lever speed measurement/determination unit 103, and rotates the wheel 51 at a rotation speed corresponding to the operation period, based on an operation of the lever device 40 in one of the plurality of stations, whose lever has been activated by the lever activating units 109 and 712.

Further, the gaming machine 1 of the present embodiment includes: a wheel 51 having a plurality of spots 52 in which a plurality of symbols 21 are arranged on the same plane, respectively, the wheel being capable of rotating in such a manner that the symbols 21 are visible; a pointer 53 fixed apart from the rotatable wheel 51, which points one of the spots 52; a motor 61 which rotates the wheel 51; a plurality of stations 10 (10*a*, 10*b*, 10*c*, 10*d*, 10*e*) each having a lever device 40 for starting rotation of the wheel 51, and a display 20 for displaying a plurality of bet areas 36 corresponding to the symbols 21, each station structured to receive a bet of a game value on a bet area 36 and to award a payout based on odds set for the bet area 36; lever activating units 109 and 712 which activate the lever device 40 of any of the stations 10, based on a predetermined condition; and a rotation speed data storage 713 which stores rotation speed data regulating the rotation speed for the rotation angle of the wheel 51; and a mass controller 70 wherein the mass controller 70 executes the processes of: (b1) storing a bet area 36 on which a bet is placed and a game value placed as the bet in each station 10, (b2) determining a resulting symbol from the plurality of symbols 21, (b3) rotating the wheel 51 based on an operation of the lever device 40 in one of the plurality of stations 10, whose lever device 40 has been activated by the lever activating units 109 and 712, (b4) controlling the motor 61 to change the rotation speed of the wheel 51 based on the rotation speed data stored in the rotation speed data storage 713, (b5) stopping the wheel 51 being rotated so that the pointer 53 points at one of the spots 52 with the resulting symbol 21, and (b6) awarding a payout based on the resulting symbol and the odds set for the bet area 36 on which the bet is placed in the station 10.

The rotation speed data regulates the rotation speed so that the rotation is accelerated or decelerated relative to the rotation angle within a predetermined period; and the mass controller 70 controls the motor 61 to accelerate or decelerate the rotation of the wheel based on the rotation speed data stored in the rotation speed data storage 713.

The mass controller 70 controls the motor 61 to rapidly decelerate the rotation of the wheel 51 and then gradually decelerate the rotation of the wheel 51 to stop the wheel 51, based on the rotation speed data stored in the rotation speed data storage 713.

Further, the gaming machine 1 of the present embodiment includes: a wheel 51 having a plurality of spots 52 in which a plurality of symbols 21 are arranged on the same plane, respectively, the wheel being capable of rotating in such a manner that the symbols 21 are visible; a pointer 53 fixed apart from the rotatable wheel 51, which points one of the spots 52; symbol LEDs 37 which light up the symbols 21; a plurality of stations 10 (10*a*, 10*b*, 10*c*, 10*d*, 10*e*) each having a lever device 40 for starting rotation of the wheel 51, and a display 20 for displaying a plurality of bet areas 36 corresponding to the symbols 21, each station structured to receive a bet of a game value on a bet area 36 and to award a payout based on odds set for the bet area 36; lever activating units 109 and 712 which activate the lever device 40 of any of the stations 10, based on a predetermined condition; and a mass controller 70, wherein the mass controller 70 executes the processes of: (c1) storing a bet area 36 on which a bet is placed and a game value placed as the bet in each station 10, (c2) determining a resulting symbol from the plurality of symbols 21, (c3) rotating the wheel 51 based on an operation of the lever device 40 in one of the plurality of stations 10, whose lever device 40 has been activated by the lever activating units 109 and 712, and lighting up all the symbols 21 by the symbol LEDs 37; (c4), stopping the wheel 51 being rotated so that the pointer 53 points at the spot 52 with the resulting symbol, and lighting up only the resulting symbol by the corresponding one of symbol LEDs 37; and (c5) awarding a payout based on the resulting symbol 21 and the odds set for the bet area 36 on which the bet is placed in the station 10.

Further, a gaming machine 1 of the present embodiment includes: a wheel 51 having a plurality of spots 52 in which a plurality of symbols 21 are arranged on the same plane, respectively, the wheel being capable of rotating in such a manner that the symbols 21 are visible; a pointer 53 fixed apart from the rotatable wheel 51, which points one of the spots 52; a plurality of stations 10 (10*a*, 10*b*, 10*c*, 10*d*, 10*e*) each having a lever device 40 for starting rotation of the wheel 51, and a display 20 for displaying a plurality of bet areas 36 corresponding to the symbols 21, each station structured to receive a bet of a game value on a bet area 36 and to award a payout based on odds set for the bet area 36; lever activating units 109 and 712 which activate the lever device 40 of any of the stations 10, based on a predetermined condition; and a rotation count table storage 714 which stores a rotation count table regulating the number of rotations of the wheel 51; and a mass controller 70, wherein the mass controller 70 executes the processes of: (d1) storing a bet area 36 on which a bet is placed and a game value placed as the bet in each station 10, (d2) determining a resulting symbol from the plurality of symbols 21, (d3) rotating the wheel 51 the number of times according to the rotation count table stored in the rotation count table storage 714, based on an operation of the lever device 40 in one of the stations 10, whose lever device 40 is activated by the lever activating units 109 and 712; (d4) stopping the wheel 51 being rotated so that the pointer 53 points at one of the spots 52 with the resulting symbol 21, and (d5) awarding a payout based on the resulting symbol 21 and the odds set for the bet area 36 on which the bet is placed in the station 10.

Further, the gaming machine 1 of the present embodiment includes: a wheel 51 having a plurality of spots 52 in which a plurality of symbols 21 are arranged on the same plane, respectively, the wheel being capable of rotating in such a manner that the symbols 21 are visible; a pin 54 provided between spots 52 adjacent to each other; a pointer 53 fixed apart from the rotatable wheel 51, which points one of the plurality of spots 52; a speaker 59 which outputs a sound effect; a plurality of stations 10 (10*a*, 10*b*, 10*c*, 10*d*, 10*e*) each having a lever device 40 for starting rotation of the wheel 51, and a display 20 for displaying a plurality of bet areas 36 corresponding to the symbols 21, each station structured to receive a bet of a game value on a bet area 36 and to award a payout based on odds set for the bet area 36; lever activating units 109 and 712 which activate the lever device 40 of any of the stations 10, based on a predetermined condition; and a mass controller 70, wherein the mass controller 70 executes the processes of (e1) storing a bet area 36 on which a bet is placed and a game value placed as the bet in each station 10, (e2) determining a resulting symbol from the plurality of symbols 21, (e3) rotating the wheel 51 based on an operation of the lever device 40 in one of the plurality of stations 10, whose lever device 40 has been activated by the lever activating units 109 and 712, (e4) when the pointer 53 passes the pin 54, outputting a sound effect from the speaker 59 based on the rotation angle of the wheel 51, (e5) stopping the wheel 51 being rotated so that the pointer 53 points at one of the spots 52 with the resulting symbol 21, (e5) awarding a payout based on the resulting symbol 21 and the odds set for the bet area 36 on which the bet is placed in the station 10.

Further, a gaming machine 1 of the present embodiment includes: a wheel 51 having a plurality of spots 52 in which a plurality of symbols 21 are arranged on the same plane, respectively, the wheel being capable of rotating in such a manner that the symbols 21 are visible; a pointer 53 fixed apart from the rotatable wheel 51, which points one of the spots 52; a pointer LED 55 which lights up the pointer 53; a plurality of stations 10 (10*a*, 10*b*, 10*c*, 10*d*, 10*e*) each having a lever device 40 for starting rotation of the wheel 51, and a display 20 for displaying a plurality of bet areas 36 corresponding to the symbols 21, each station structured to receive a bet of a game value on a bet area 36 and to award a payout based on odds set for the bet area 36; lever activating units 109 and 712 which activate the lever device 40 of any of the stations 10, based on a predetermined condition; and a mass controller 70, wherein the mass controller 70 executes the processes of: (f1) storing a bet area 36 on which a bet is placed and a game value placed as the bet in each station 10, (f2) determining a resulting symbol from the plurality of symbols 21, (f3) rotating the wheel 51 and lighting up the pointer 53 by the pointer LED 55, based on an operation of the lever device 40 in one of the plurality of stations 10, whose lever device 40 has been activated by the lever activating units 109 and 712; (b5) stopping the wheel 51 being rotated so that the pointer 53 points at one of the spots with the resulting symbol 21, and (f5) awarding a payout based on the resulting symbol 21 and the odds set for the bet area 36 on which the bet is placed in the station 10.

Further, a gaming machine 1 of the present embodiment includes: a wheel 51 having a plurality of spots 52 in which a plurality of symbols 21 are arranged on the same plane, respectively, the wheel being capable of rotating in such a manner that the symbols 21 are visible; a display 20 which displays a plurality of bet areas 36 corresponding to the plurality of symbols 21, respectively; a plurality of stations 10 (10*a*, 10*b*, 10*c*, 10*d*, 10*e*) each structured to receive a bet of a game value on a bet area 36 and to award a payout based on odds set for the bet area 36; a mass controller 70 which stores a bet area 36 on which a bet is placed and a game value placed as the bet in each station 10, determines a resulting symbol from the plurality of symbols 21 through the rotation of the wheel 51, and awards a payout based on the resulting symbol 21 and the odds set for the bet area 36 on which the bet is placed in the station 10; wherein the mass controller 70 adjusts the payout rate by varying the odds set for the bet areas 36 in the plurality of stations 10.

Further, the gaming machine 1 of the present embodiment includes: a wheel 51 having a plurality of spots 52 in which a plurality of symbols 21 are arranged on the same plane, respectively, the wheel being capable of rotating in such a manner that the symbols 21 are visible; a display 20 which displays a plurality of bet areas 36 corresponding to the plurality of symbols 21, respectively; a plurality of stations 10 (10*a*, 10*b*, 10*c*, 10*d*, 10*e*) each structured to receive a bet of a game value on a bet area 36 and to award a payout based on odds set for the bet area 36; a mass controller 70 which stores a bet area 36 on which a bet is placed and a game value placed as the bet in each station 10, determines a resulting symbol from the plurality of symbols 21 through the rotation of the wheel 51, and awards a payout based on the resulting symbol 21 and the odds set for the bet area 36 on which the bet is placed in the station 10; wherein the payout rate is adjusted by changing the number of symbols 21 arranged in the spots 52.

Further, the mass controller 70 switches the form of displaying the odds set for the bet areas 36 on the display 20 of the station 10.

Note that the "operation of the lever device 40" in the present embodiment means pulling the lever device 40 provided to each station 10 towards the player. In the present embodiment, the wheel 51 is rotated by pulling the lever device 40. Note that the operation of the lever device 40 is not limited to pulling of the same towards the player. For example, the operation may be pushing of the lever device 40 in a direction away from the player or pressing of a button.

Further, the "activating the lever device 40" means to shift the state of the lever device 40 from the state in which the operation is disabled to the state in which the operation is possible. That is, the lever device 40 cannot be operated while it is inactive, and can be operated when it is active.

Note that, in the present embodiment, the "game medium" uses medals; however, a game medium such as bills or the like may be adopted.

(Function Flow of Gaming Machine)

The following describes functions of the gaming machine 1 of the present embodiment, with reference to FIG. 2. As shown in FIG. 2, the station 10 waits for a bet by a player on a bet area 36 displayed on the display 20. The bet area 36 on which the bet is placed and the bet amount thereon are received by the bet information receiving unit 101 as bet information, and stored in the bet information storage 102 in the form of a bet information managing table shown FIG. 14. The bet information thus stored is transmitted in the form of a bet information signal, from the transmission/reception unit 110 to the transmission/reception unit 710 on the mass controller 70 side. On the mass controller 70 side, the bet information received is stored in the bet information storage 701 in the form of station managing table shown in FIG. 16. Then, based on the bet information thus stored, a lever operator determination unit 702 executes lever operator determination process. The lever operator determination process is a process for determining which station 10 can rotate the wheel 51 when starting the game. Such a station 10 which can rotate the wheel 51 is determined based on a predetermined condition referring to the bet information; e.g., a station 10 through which a greatest amount of bet has been placed among the plurality of the stations 10. When the lever operator determination process is executed by the lever operator determination unit 702, a lever operator signal which causes the lever device 40 to be active is transmitted to a station 10 from the lever activating unit 712 via the transmission/reception unit 710, so as to enable the station 10 to rotate the wheel 51.

The lever operator signal having been transmitted from the mass controller 70 side is receive by the lever activating unit 109 on the station 10 side, and the lever device 40 is activated by the lever activating unit 109. Note that, instead of determining a station 10 through which a greatest amount of bet has been entered as the station 10 to rotate the wheel 51, a station 10 to rotate the wheel 51 can be determine according to a predetermined sequence. Further, the lever activating units 109 and 712 prohibit activation of the lever device 40 in a station 10 if the amount of bet from that station 10 falls short of a predetermined amount of game value. Note that the lever activating units 109 and 712 are provided to the station 10 and the mass controller 70, respectively, in the present embodiment. However, it is possible that one of the station 10 and the mass controller 70 has a lever activating unit. In other words, the lever device 40 may be activated by the lever activating unit 109 of the station in response to the lever operator signal directly received from the lever operator determination unit 702, or activated directly by the lever activating unit 712 of the mass controller 70.

In the station 10 whose lever device 40 is activated, the lever device 40 is operated by the player. At this point, the lever speed measurement/determination unit 103 measures an operation period of the lever device 40 having been operated, and determines which one of three speed levels (Slow, Normal, Fast) the measured speed falls under by referring to the lever operation time table shown in FIG. 15. The speed level thus determined is stored in a lever speed information storage 104 and is transmitted as the lever speed signal from the transmission/reception unit 110 to the mass controller 70. On the mass controller 70 side, a wheel rotation speed random determination unit 703 randomly determines the rotation speed of the wheel 51 based on the lever speed information having been received. For example, when the speed level is determined as to be Slow, referring to the wheel rotation speed table shown in FIG. 17, the wheel rotation speed random determination unit 703 randomly determines one of the 8 rpm and 9 rpm as the initial velocity. Thus, the initial rotation speed of the wheel 51 is determined. After that, the resulting symbol is determined from the plurality of symbols 21 by the resulting symbol random determination unit 715.

Figure 21:
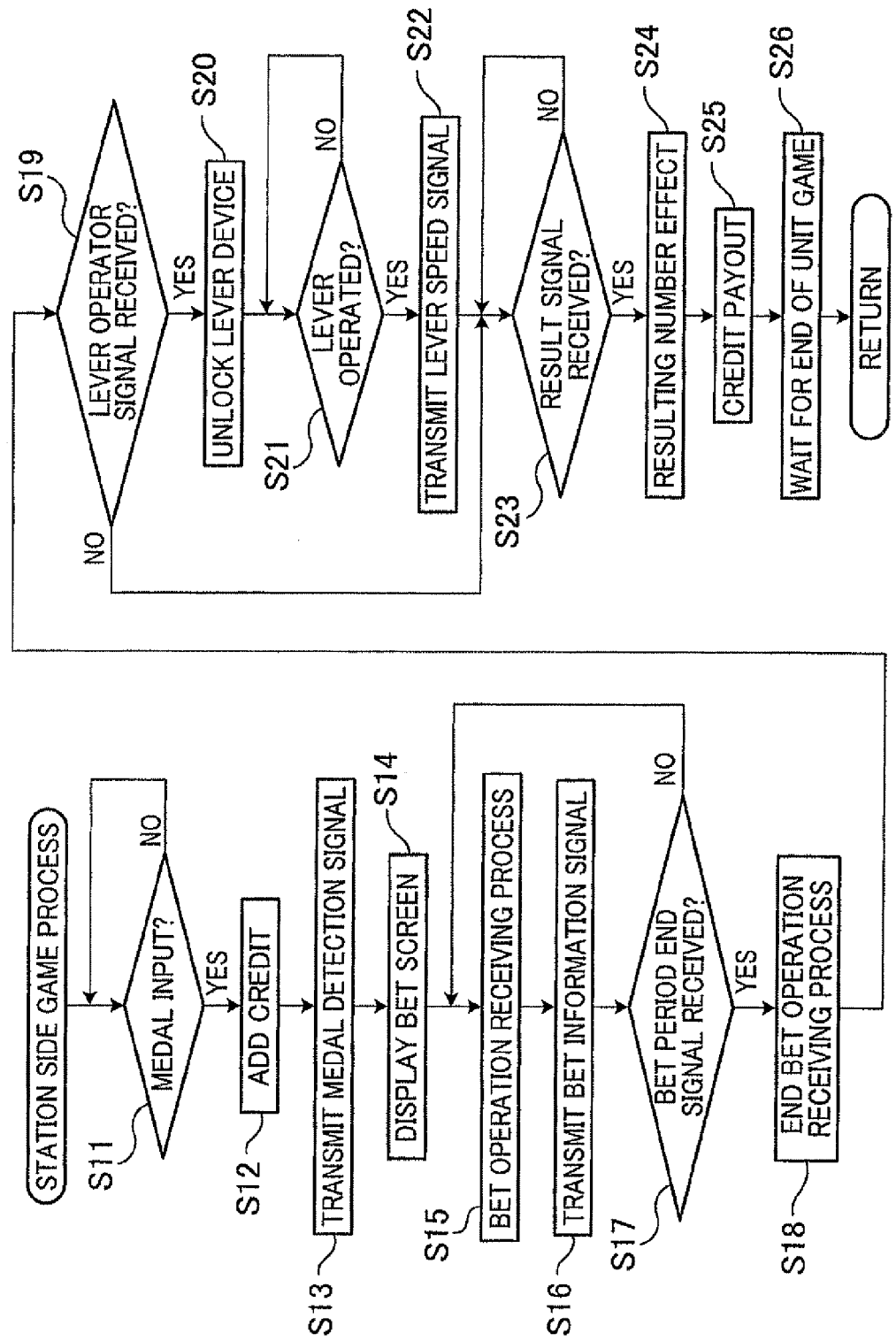
FIG. 21 is a flowchart of the station side game process which is executed by a station controller related to the embodiment of the present invention.

Then, a wheel stop-effect pattern random determination unit 705 determines a stop effect of the wheel 51, referring to the wheel stop-effect pattern table shown in FIG. 18. Through this process, a point position of the pointer 53 pointing the spot 52 with the resulting symbol, i.e., the stop position of the wheel 51 is determined, and the rotation angle of the wheel 51 up to the next stop position is determined. Next, the motion controller 66 is controlled by the wheel rotation speed curve adjusting unit 704, so that the rotation speed curve of the wheel 51 within a predetermined period is determined based on rotation speed data stored in the rotation speed data storage 713. The rotation speed curve of the wheel 51 is a curve showing the transition of the rotation of the wheel 51 from the start to the stop, in relation to the rotation angle of the wheel 51, as shown in FIG. 21. Thus, the rotation angle of the wheel 51 and the rotation speed in relation to the rotation angle are determined through calculation. Note that, it is a characteristic of the present embodiment that, when the wheel 51 is stopped, the rotation of the wheel 51 is rapidly decelerated (first deceleration period) and then gradually decelerated (second decelerate period), so that the wheel 51 is stopped in a short period.

After that, the game running unit 708 runs the game by rotating the wheel 51. At this time, the game running unit 708 controls the motor 61 provided to the roulette device 50 so as to rotate the wheel 51 while varying the speed of the rotation. Note that there are cases in which the game running unit 708 stops the wheel 51 after rotating the wheel 51 twice or three times, based on the rotation count table regulating the number of rotations of the wheel 51, the rotation count table being stored in the rotation count table storage 714. Further, a pointer position determination unit 706 accurately determines whether or not the pointer 53 has passed a pin 54, based on the tilt of the pointer 53 of the roulette device 50 detected by a later mentioned pointer position detection sensor 56. Further, a pin position determination unit 707 accurately determines the rotation angle of the wheel 51, based on the position information of the pin 54 of the roulette device 50 detected by a later mentioned pin position detection sensor 57.

When rotating the wheel 51, the game running unit 708 controls the symbol LEDs 37 provided in the roulette device 50 to light up all the symbols 21 being rotated. When stopping the wheel 51, the game running unit 708 controls the symbol LEDs 37, so that only the symbol resulted is lighted up. When rotating the wheel 51, the game running unit 708 controls the pointer LED 55 provided to the roulette device 50 to light up the pointer 53 while the wheel 51 is rotating. Further, when rotating the wheel 51, the game running unit 708 causes output of a sound effect from the speaker 59 of the roulette device 50 based on the rotation angle of the wheel 51 when the pointer 53 passes the pin 54 between two adjacent spots 52.

When the resulting symbol is determined in the game run as described above, result information is transmitted as a result signal to the transmission/reception unit 110 of the station 10. The result information at least contains: information of the symbol 21 having been resulted; and information on a payout which is determined referring to a payout pattern table shown in FIG. 19, based on the bet information of the bet having been entered from the station 10. Note that FIG. 19 shows payout pattern tables, in each of which the odds is changed to adjust the payout rates. The payout rate is freely adjustable by selecting a desirable payout pattern table. The payout rate may be adjusted by changing the number of symbols 21 on the wheel 51, instead of changing the odds in the payout pattern table. Next, the an effect for the result is determined by the resulting number effect determination unit 106, based on the result information received by the transmission/reception unit 110, and the effect for the result is given by using the speaker 18 or a liquid crystal display device 19. Further, based on the result information, the payout is determined by the payout determination unit 107 and is awarded by the payout unit 108.

Note that a bet period measurement unit 711 in the mass controller 70 measures a bet period which is a period for receiving a bet from any of the plurality of stations 10. When the bet period is elapsed, the bet period measurement unit 711 transmits a bet period end signal from the transmission/reception unit 710 to the stations to end reception of a bet. When a payout display changing button 12 of the station 10 is pressed by a player, the payout display content changing unit 105 outputs a signal to change the form of displaying the odds set for the bet areas 36. Based on this signal, the form of displaying on the display 20 of the liquid crystal display device 19 is changed.

As described, with the gaming machine 1 of the present embodiment, the wheel 51 used in the game is automatically rotated or stopped by controlling the mass controller 70. Thus, unlike a simple roulette game, various effects can be provided to the game, and the entertainment characteristic of the game is improved. The wheel 51 used in the game is also rotatable by having the player operate the lever device 40 provided to the station 10. Since the game can be started by a hand of the player, the player may feel more involved in the game and become more enthusiastic about the game. Further, since the player of only one station 10 among the plurality of stations 10 is able to operate the lever device 40, the player who can operate the lever device 40 feels he/she is more advantaged than the other players. This makes the operation of the lever device 40 very attractive to the players, and as a result, the entertainment characteristic of the game is improved.

Further, with the gaming machine 1 of the present embodiment, the player tries to bet more than the others to operate the lever device 40 which rotates the wheel 51. This contributes to heating up the game, and further improves the entertainment characteristic of the game.

Further, with the gaming machine 1 of the present embodiment, the right to operate the lever device 40 for rotating the wheel 51 is rotated to each station 10. This contributes to the reduction of the possibility that the player trying to operate the lever device 40 while it is not his/her turn and consequently damaging or deteriorating the lever device 40.

Further, with the gaming machine 1 of the present embodiment, the lever device 40 cannot be operated if the amount of bet entered falls short of a predetermined amount of game value. This motivates the player to bet at least the predetermined amount of game value to operate the lever device 40. As the result, the gaming machine 1 has an improved cost performance. Further, since the player who has not yet bet the predetermined amount of game value is not able to operate the lever device 40, the right for operating the lever device 40 will not be given to a vacant station 10, nor will it be given to the player who not yet participated into the game.

Further, with the gaming machine 1 of the present embodiment, the wheel 51 rotates at a rotation speed corresponding to the operation period of the lever device 40 for rotating the wheel 51. Therefore, the rotation speed of the wheel 51 is not the same every time the wheel 51 is rotated. When compared with a gaming machine 1 in which the wheel 51 rotates in the same manner all the time, the above gaming machine 1 provides an improved entertainment characteristic that more likely keeps the enthusiasm of the players to the game, without causing them to get board of the game.

Further, with the gaming machine 1 of the present embodiment, the rotation speed of the wheel 51 can be varied by controlling the motor 61 with the mass controller 70. Therefore, for example, the wheel 51 can be rotated at a desirable rotation speed, and stopped at a desirable position. This enables wider variation of the game, and further improves the entertainment characteristic.

Further, with the gaming machine 1 of the present embodiment, the rotation speed of the wheel 51 is accelerated and decelerated within a predetermined period. When compared with a gaming machine 1 in which the wheel 51 rotates at a constant speed, the above gaming machine 1 provides an improved entertainment characteristic that more likely keeps the enthusiasm of the players to the game, without causing them to get board of the game.

Further, with the gaming machine 1 of the present embodiment, the rotating wheel 51 is rapidly decelerated once, and then is gradually decelerated and stopped. Thus, even when a large wheel 51 which generates a large inertia is adopted, the wheel 51 is gradually stopped in a short period. This improves the operation rate of the gaming machine 1.

Further, with the gaming machine 1 of the present embodiment, it is possible to provide an effect that all the symbols 21 are lighted up during the rotation of the wheel 51, and when the wheel 51 stops and the resulting symbol is determined, only the resulting symbol is lighted up. This lighting effect enables the players to feel the excitement of the scene, and further improves the entertainment characteristic of the game.

Further, with the gaming machine 1 of the present embodiment, it is possible to rotate the wheel 51 a predetermined number of times. Therefore, for example, if the wheel 51 needs to be rotated at least three times according to a national regulation, the wheel 51 is stopped after the rotating at least three times, and if the wheel 51 needs to be rotated at least twice, according to a national regulation, the wheel 51 is stopped after rotating at least twice. As is understood from this, the number of rotations of the wheel 51 is freely adjustable. Therefore, it is possible to speed up the game in some countries.

Further, with the gaming machine 1 of the present embodiment, a sound effect is output from the speaker 59, based on the rotation angle of the wheel 51 when the pointer 53 passes a pin 54. It is therefore possible to, for example, output a sound effect only when the pointer completely passes the pin 54. This sound effect enables the players to feel the excitement of the scene, and further improves the entertainment characteristic of the game.

Further, with the gaming machine 1 of the present embodiment, the pointer 53 is lighted up during the rotation of the wheel 51. It is therefore possible to provide the player with this light up effect, and the entertainment characteristic of the game is further improved. This light up effect further yields an advantageous effect that people can grasp the progression of the game from a far distance.

With the gaming machine 1 of the present embodiment, the wheel 51 used in the game is automatically rotated or stopped by controlling the mass controller 70. Thus, unlike a simple roulette game, various effects can be provided to the game, and the entertainment characteristic of the game is improved. Further, the payout rate is adjustable by changing the odds. For example, by adjusting the payout rate according to the operation rate of the gaming machine 1, the operation rate of the gaming machine 1 could be effectively improved.

Further, with the gaming machine 1 of the present embodiment, the payout rate is adjustable by changing the number of symbols 21. For example, by adjusting the payout rate according to the operation rate of the gaming machine 1, the operation rate of the gaming machine 1 could be effectively improved.

Further, with the gaming machine 1 of the present embodiment, the form of displaying the odds on the display 20 of the station 10 is switchable. Therefore, the form of displaying can be adjusted to a form that is easiest to see for the players while playing the game.

(Mechanical Structure of Gaming Machine)

Next, the following more specifically describes mechanical structure of the gaming machine 1 of the present embodiment. As shown in FIG. 1, the gaming machine 1 includes: a roulette device 50, a plurality of stations 10 (10a, 10b, 10c, 10d, 10e) each having a lever device 40 and a display 20. The plurality of stations 10 are arranged adjacent to one another and in front of the roulette device 50 so that the player playing a game on any station 10 can see the plurality of symbols 21 on the wheel 51 of the roulette device 50.

Figure 4:
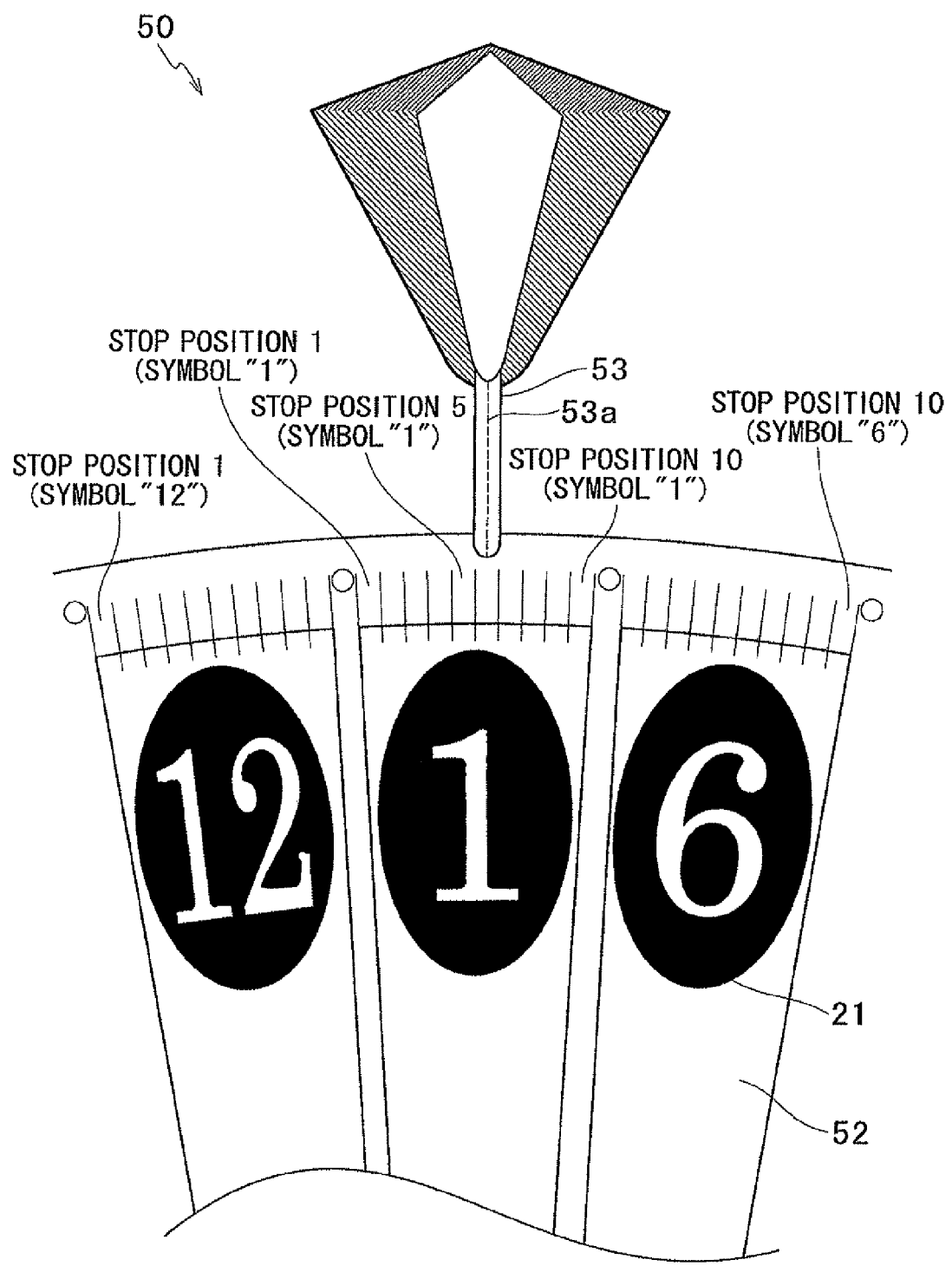
FIG. 4 is an enlarged view showing a part of the wheel of the roulette device related to the embodiment of the present invention.

As shown in FIG. 3, the roulette device 50 has a large circular wheel 51 which is supported to be rotatable about the center thereof. The wheel 51 has a plurality of spots 52 arranged on the same plane along the perimeter of the wheel 51, and each spot 52 has one symbol 21. At a border between two spots 52 adjacent to each other is provided a pin 54. Thus, with the rotation of the wheel 51, the spot 52, the symbol 21, and the pin 54 are rotated. Further, as shown in FIG. 4, on top of the wheel 51 is provided a pointer 53 which is separately fixed from the wheel 51. The pointer 53 has therein an elastic core member 53a, which is surrounded by a light-transmissive resin such as urethane so as to enable the light to pass. Further, pointer 53 is fixed only at the top part thereof, and the lower part is movable to the left and right. When the wheel 51 is rotated, the lower part of the pointer 53 contacts the pins 54 which are rotating with the wheel 51 and moves to the left and right in a manner similar to a pendulum. When the rotation of the wheel 51 stops, the wheel 51 is completely stopped by the contact resistance between the lower part of the pointer 53 and the pins 54. At this time, the lower part of the pointer 53 points at the spot 52 with the resulting symbol 21. Note that the elasticity of the core member 53a of the pointer 53 brings back the pointer 53 to the original position despite the movement of the pointer 53 to the left and right. Further, the plurality of symbols 21 on the wheel 51 can be set by fitting them from the back side of the wheel 51. Therefore, it is possible to adjust the number of symbols 21. For example, it is possible to increase the number of a certain type of symbols. The symbols 21 on the wheel 51 may be displayed using a liquid crystal display device, and the number of symbols 21 may be adjusted by changing the displaying through the mass controller 70.

Further, in the roulette device 50 of the present embodiment, the rotation angle of the wheel 51 between one stop position to the subsequent stop position is randomly determined in advance. The wheel 51 is stopped upon rotating up to the rotation angle determined in advance. Further, in the present embodiment, there has been randomly determined which position of a spot 52 the pointer 53 points when the wheel 51 is stopped. For example, in FIG. 4, each of the spot 52 on the wheel 51 is parted by imaginary lines, into 10 segments: stop positions 1 to 10. Thus, when the wheel 51 is stopped at a predetermined rotation angle, the pointer 53 points any of the stop positions within the spot 52 with the resulting symbol. For example, when the wheel 51 is stopped so that the pointer 53 points at the stop position 10 of the spot 52 with the resulting symbol, the player may have an impression that the pointer 53 almost reached the symbol 21 next to the resulting symbol but did not make it. Further, for example, when the wheel 51 is stopped so that the pointer 53 points at the stop position 1 of the spot 52 with the resulting symbol, the player may have an impression that the pointer 53 somehow managed to pass the symbol before the resulting symbol 21. In the present embodiment, the pointer 53 is controlled so that the pointer 53 more likely points one of the two ends of the spot 52 (i.e., stop position 1 or stop position 10), when the resulting symbol 21 is a later described "JOKER" or "LOGO" which awards a high payout. This provides an extra thrill to the player, when a high payout is to be awarded.

Figure 5:
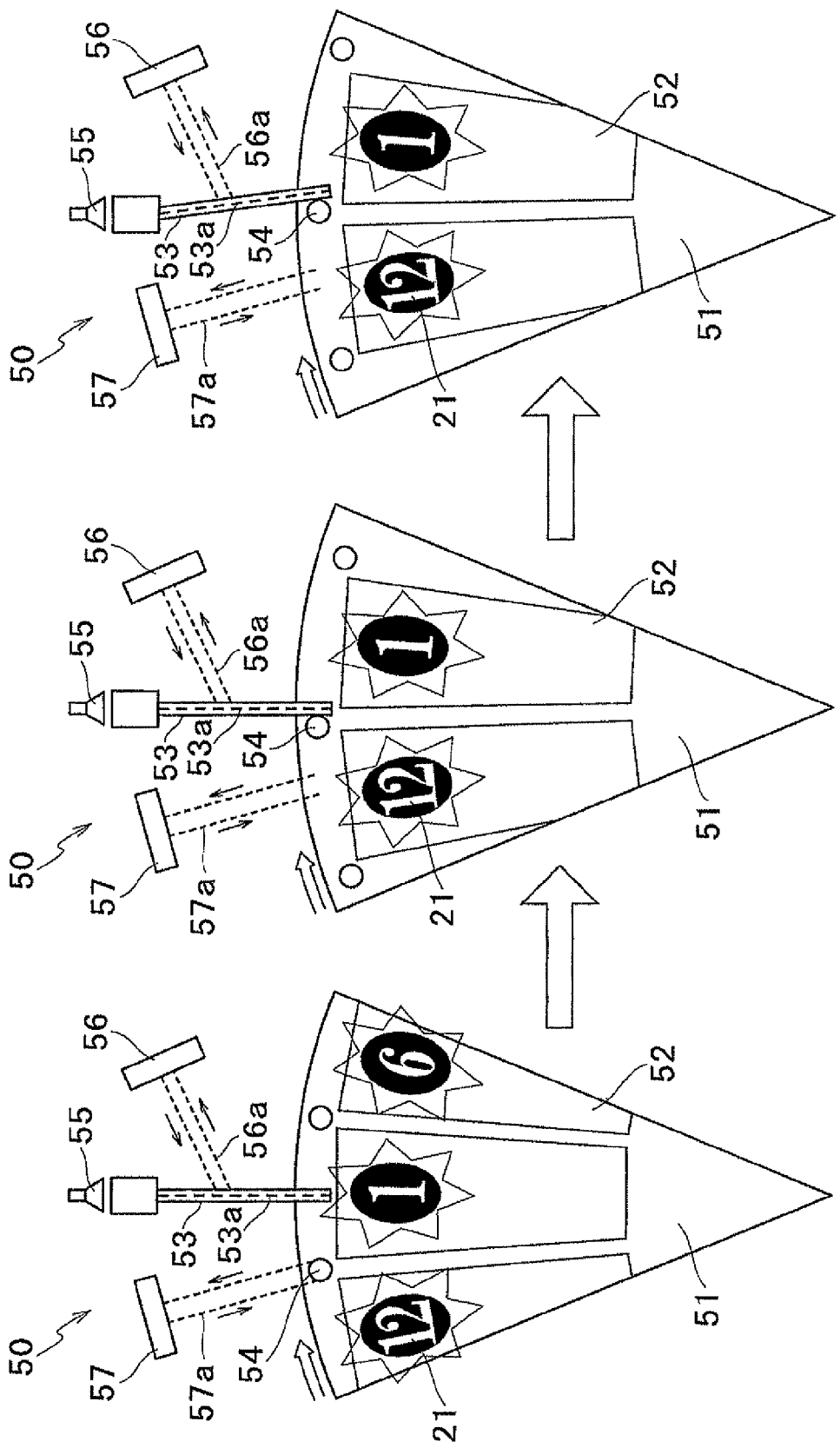
FIG. 5A is a diagram explaining the operation of the wheel of the roulette device related to the embodiment of the present invention.
FIG. 5B is a diagram explaining the operation of the wheel of the roulette device related to the embodiment of the present invention.
FIG. 5C is a diagram explaining the operation of the wheel of the roulette device related to the embodiment of the present invention.
Figure 6:
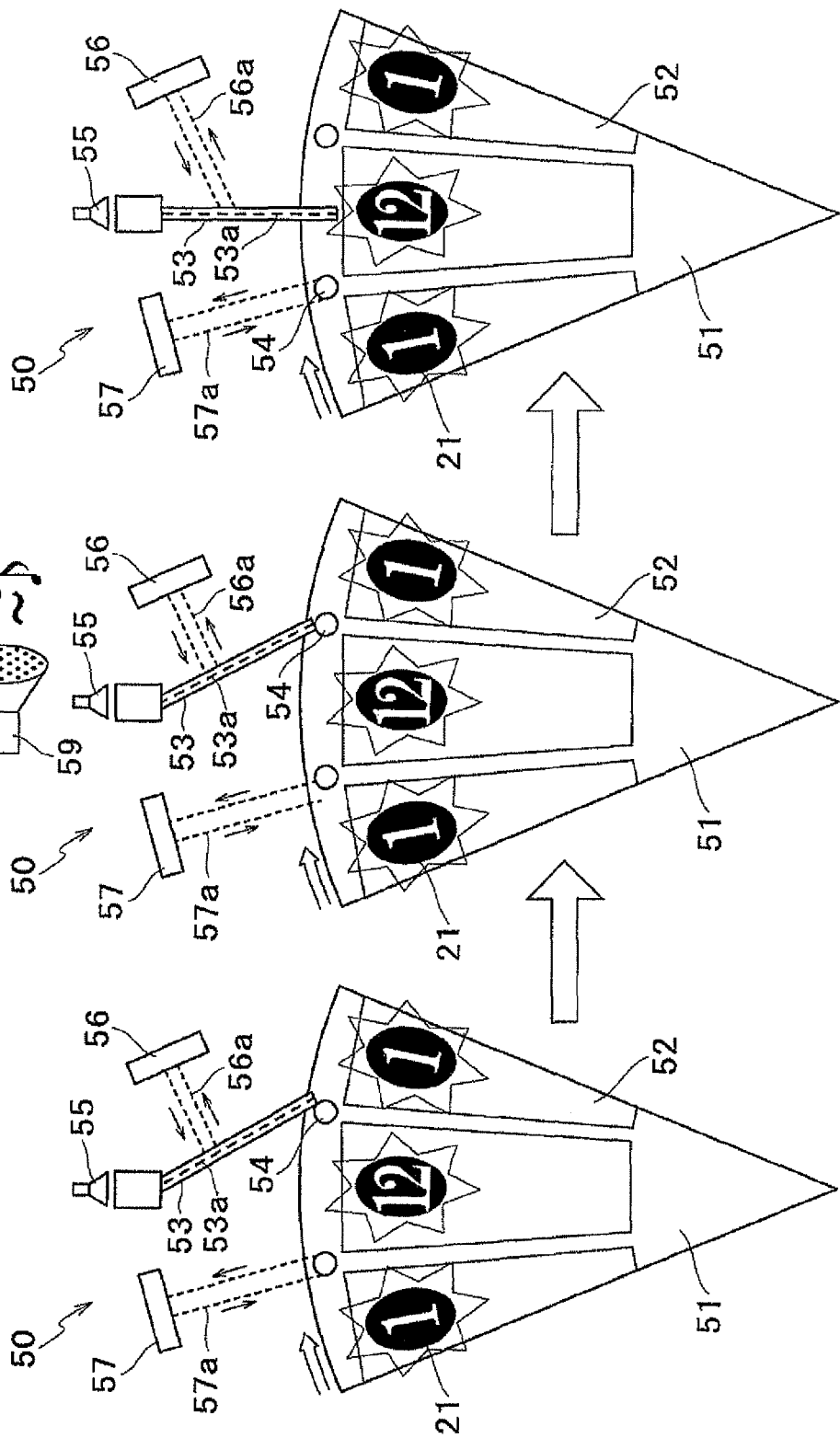
FIG. 6A is a diagram explaining the operation of the wheel of the roulette device related to the embodiment of the present invention.
FIG. 6B is a diagram explaining the operation of the wheel of the roulette device related to the embodiment of the present invention.
FIG. 6C is a diagram explaining the operation of the wheel of the roulette device related to the embodiment of the present invention.

Next, with reference to FIG. 5 and FIG. 6, the following details how the wheel 51 is rotated. As shown in FIG. 5, the pointer 53 has, at its top part, a pointer LED 55 which lights up the pointer 53 while the wheel 51 is rotating. This provides the player with a light up effect of the pointer 53, and improves the entertainment characteristic of the game. This light up effect further yields an advantageous effect that people can grasp the progression of the game from a far distance. On the right side of the pointer 53 is a pointer position detection sensor 56. When the wheel 51 is rotated clockwise, a laser beam 56a emitted from the pointer position detection sensor 56 is reflected at the center of the pointer 53 and returns to the pointer position detection sensor 56. Based on the period from the point of emitting the laser beam 56a to the point of receiving the returning beam, the pointer position detection sensor 56 detects the tilt angle of the pointer 53. Thus, the mass controller 70 is able to accurately determine whether the pointer 53 has passed a pin 54, based on this information, and is able to accurately control the rotation angle of the wheel 51. Note that the pointer position detection sensor 56 is set obliquely to the wheel 51 so that the rotating wheel 51 or the pins 54 do not disturb the detection using the laser beam 56a. The setting positions and the number of pointer position detection sensors 56 are not limited, and are suitably settable. Further, the means for the pointer position detection sensor 56 to detect the pointer 53 is not limited to a laser beam 56a, and other means may be adopted. On the other hand, on the left side of the wheel 51 is provided a pin position detection sensor 57. The pin position detection sensor 57 is capable of detecting the position of the pin 54 by emitting a laser beam 57a to the wheel 51 and receiving the returning laser beam 57a. For example, the pin position detection sensor 57 detects a pin 54 and detects a subsequent pin 54 with the rotation of the wheel 51. Based on a period between the detection of one pin 54 and detection of the subsequent pin 54, the mass controller 70 accurately detects the rotation angle of the wheel 51. This way, the mass controller 70 is able to accurately control the rotation angle of the rotating wheel 51. Note that the setting positions and the number of the pin position detection sensors 57 are not limited and are suitably settable. Further, the means for the pin position detection sensor 57 to detect the pin 54 is not limited to a laser beam 57a, and other means may be adopted.

As shown in FIG. 5, when the wheel 51 rotates clockwise, a laser beam 56a is emitted from the pointer position detection sensor 56, and detection of the position of the pointer 53 is started. At the same time, a laser beam 57a is emitted from the pin position detection sensor 57 and detection of the position of the pin 54 is started. (see FIG. 5A). While the wheel 51 is rotating, the symbols 21 are lighted up by the symbol LEDs 37. This lighting effect of the symbols 21 enables the players to feel the excitement of the scene, and further improves the entertainment characteristic of the game.

When the wheel 51 continues to rotate, the pointer 53 eventually contacts a pin 54 (see FIG. 5B). Then, the pin 54 pushes only the lower part of the pointer 53 which is moveable to the left and right, with the rotation of the wheel 51. This tilts the pointer 53 (see FIG. 5C). When the wheel 51 further rotates, the pointer 53 is further tilted (see FIG. 6A). Eventually, at the moment where the pointer 53 passes the pin 54 with the rotation of the wheel 51, a sound effect is output from the speaker 59 of the roulette device 50 (see FIG. 6B). Note that the timing of outputting the sound effect from the speaker 59 is based on the rotation angle of the wheel 51 when the pointer 53 passes the pin 54. In other words, in the present embodiment, the rotation angle of the wheel 51 is determined based on the stop position of the wheel 51 before the rotation and the stop position within the spot 52 with the resulting symbol. However, the rotation angle of the wheel 51 for the pointer 53 to pass each of the pins 54 is also determined through calculation. Every time the wheel 51 reaches the calculated rotation angle, a sound effect is output from the speaker 59. There are two volume levels for the sound effect output from the speaker 59 which are set so that the sound effect to be output before the wheel 51 stops is output at a higher volume level. The number of volume levels of the sound effect to be output from the speaker 59 is not limited to two levels, and is suitably settable. As described, a sound effect is output from the speaker 59, based on the rotation angle of the wheel 51 when the pointer 53 passes a pin 54. It is therefore possible to, for example, output a sound effect only when the pointer 53 completely passes the pin 54. This sound effect enables the players to feel the excitement of the scene, and further improves the entertainment characteristic of the game. Further, since the volume level of the sound effect from the speaker 59 is varied according to the state of the rotation of the wheel 51, the sound effect causes the players to feel more excitement of the scene.

Next, if the resulting symbol 21 is "12", the rotation of the wheel 51 is stopped so that the pointer 53 points a predetermined stop position of the spot 52 with the symbol 21 of "12" (see FIG. 6C). Note that, when the rotation of the wheel 51 is completely stopped and when the pointer 53 points at the resulting symbol, the resulting symbol which is the symbol 21 of "12" is further lighted up, and while the lighting of the other symbols 21 is shut down.

Further, the pointer position detection sensor 56 transmits an error signal to the mass controller 70, when the pointer 53 is kept tilted for a predetermined period after the wheel 51 is stopped. Then, through the mass controller 70, an error message is displayed on a not-shown display unit provided to the roulette device 50. Note that an alarm sound may be output from the speaker 59, in addition to the error message displayed on the display unit.

Figure 7:
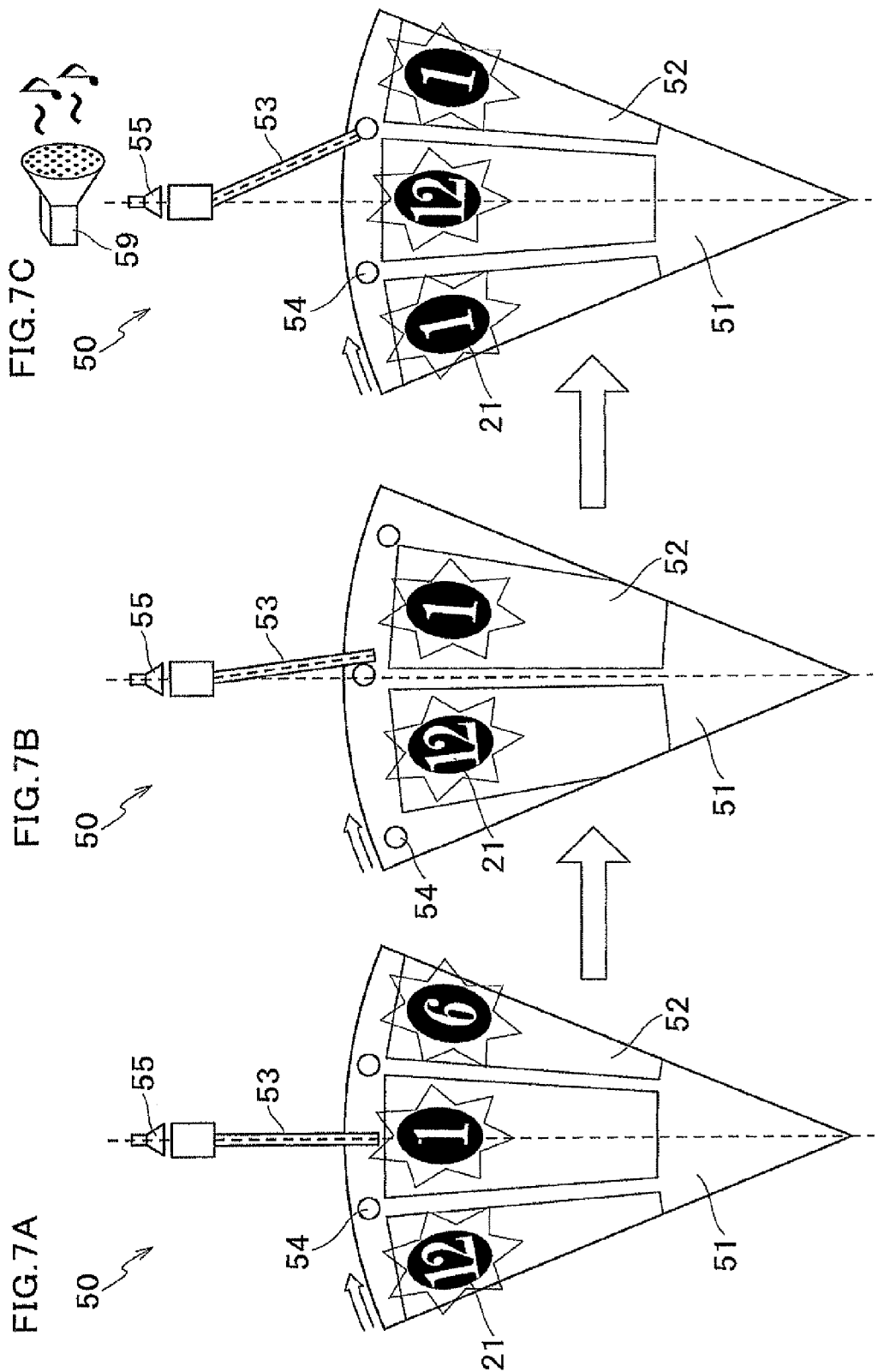
FIG. 7A is a diagram explaining the operation of the wheel of the roulette device related to another embodiment of the present invention.
FIG. 7B is a diagram explaining the operation of the wheel of the roulette device related to the other embodiment of the present invention.
FIG. 7C is a diagram explaining the operation of the wheel of the roulette device related to the other embodiment of the present invention.

Further, in the present embodiment, a sound effect is output from the speaker 59 based on the predetermined rotation angle of the wheel 51; however, the method shown in FIG. 7 is also possible. For example, the roulette device 50 may have means for detecting an angle between the pointer 53 in a state in which the wheel 51 is stopped and the pointer 53 is vertical (see FIG. 7A) and the pointer 53 which is tilted by the clockwise rotation of the wheel 51 (see FIG. 7B). Then, the pointer 53 may be determined as to have passed the pin 54, when the angle of the pointer 53 with respect to the vertical direction exceeds a predetermined angle α (see FIG. 7C), and a sound effect may be then output from the speaker 59.

Figure 8:
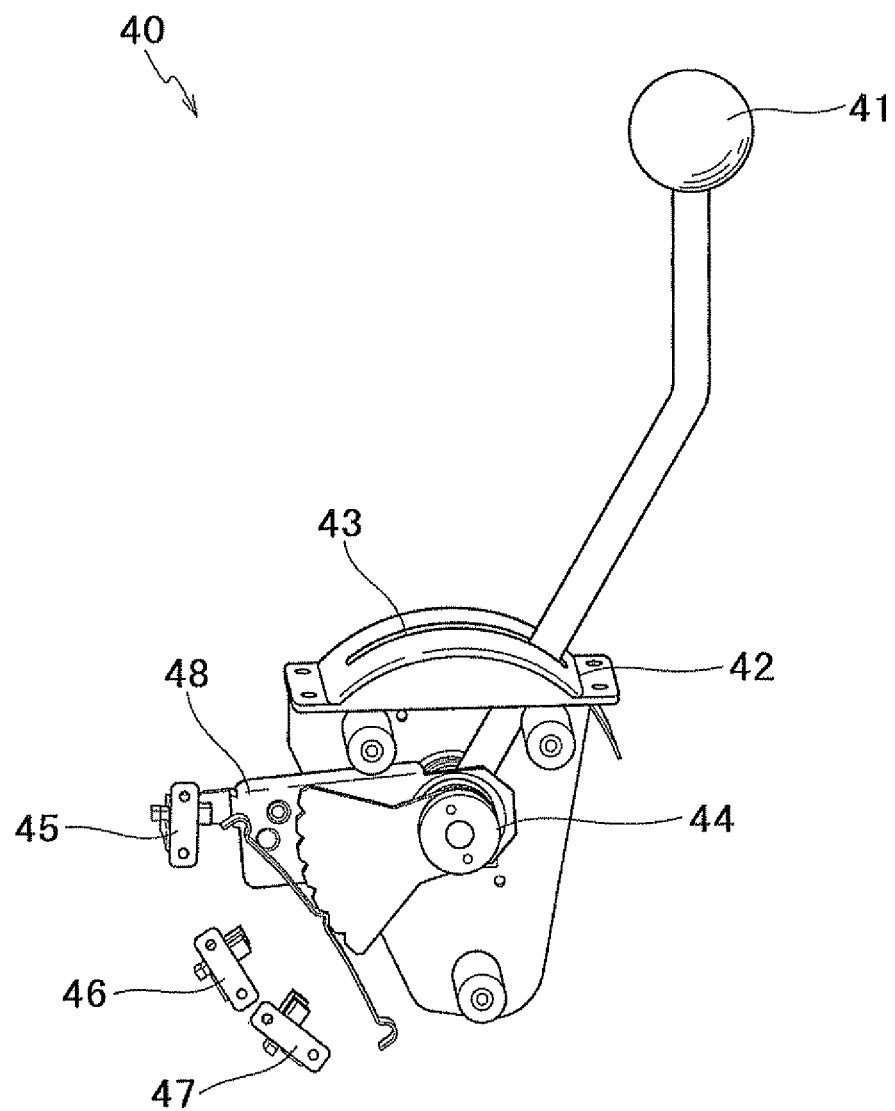
FIG. 8 is a diagram explaining a lever device of a station related to the embodiment of the present invention.

Next, the following describes the lever device 40 of the station 10 with reference to FIG. 8. The lever device 40 has a player-operable lever 41, a cabinet 42 supporting the lever 41, a lever moving part 44 which makes the lever 41 movable, a start point sensor 45, a midpoint sensor 46, and an end point sensor 47.

The lever 41 projects from a groove 43 of the cabinet 42 and is movable along the groove. Further, the lower end portion of the lever 41 is connected to the lever moving part 44 which controls the movement of the lever 41. The lever moving part 44 has a projection 48 which is moved with the movement of the lever 41. For example, when the lever 41 is not moved (on the right side of the figure), the projection 48 abuts the start point sensor. When the lever 41 moves to approximately the middle of the groove 43, the projection 48 abuts the midpoint sensor 46. When the lever 41 moves to the end (on the left side of the figure), the projection 48 abuts the end point sensor 47. As described, when the player operates the lever device 40 to move the lever 41, the projection 48 moves between the start point sensor 45 and the end point sensor 47.

The start point sensor 45 senses an operation of the lever device 40, when the projection 48 separates from the start point sensor 45. The midpoint sensor 46 senses the time point where the projection 48 abuts thereto. Then, the station controller 100 measures the time taken for the projection 48 to move from the start point sensor 45 to the midpoint sensor 46. This measured time is used for determining the rotation speed of the wheel 51. The end point sensor 47 senses abutting of the projection 48 thereto. Note that, if the projection 48 is abutted to the end point sensor 47 for a predetermined period, an alarm is output from the speaker 18. In this case, the wheel 51 does not start rotating, until the player puts back the lever 41. It is possible to adopt a structure in which the station controller 100 controls the lever moving part 44 to automatically bring back the lever 41 to the original state, if the projection 48 is abutted to the end point sensor 47 for a predetermined period. Note that the reason for determining the operation period of the lever device 40 by the operation of the lever device 40 from the start point sensor 45 to the midpoint sensor 46 is that, if the operation period is determined at the end point sensor 47, the player may operate the lever 41 up to the end point sensor 47 with a great force. If the player pulls the lever 41 to the end point sensor 47, the lever 41 may hit the end portion of the groove 43 with a great force thus damaging the lever device 40. In the present embodiment, the operation period is determined at the midpoint sensor 46. Therefore, the force of operating the lever 41 from the midpoint sensor to the end point sensor is restrained.

(Display Mode of Display of Station)

Figure 9:
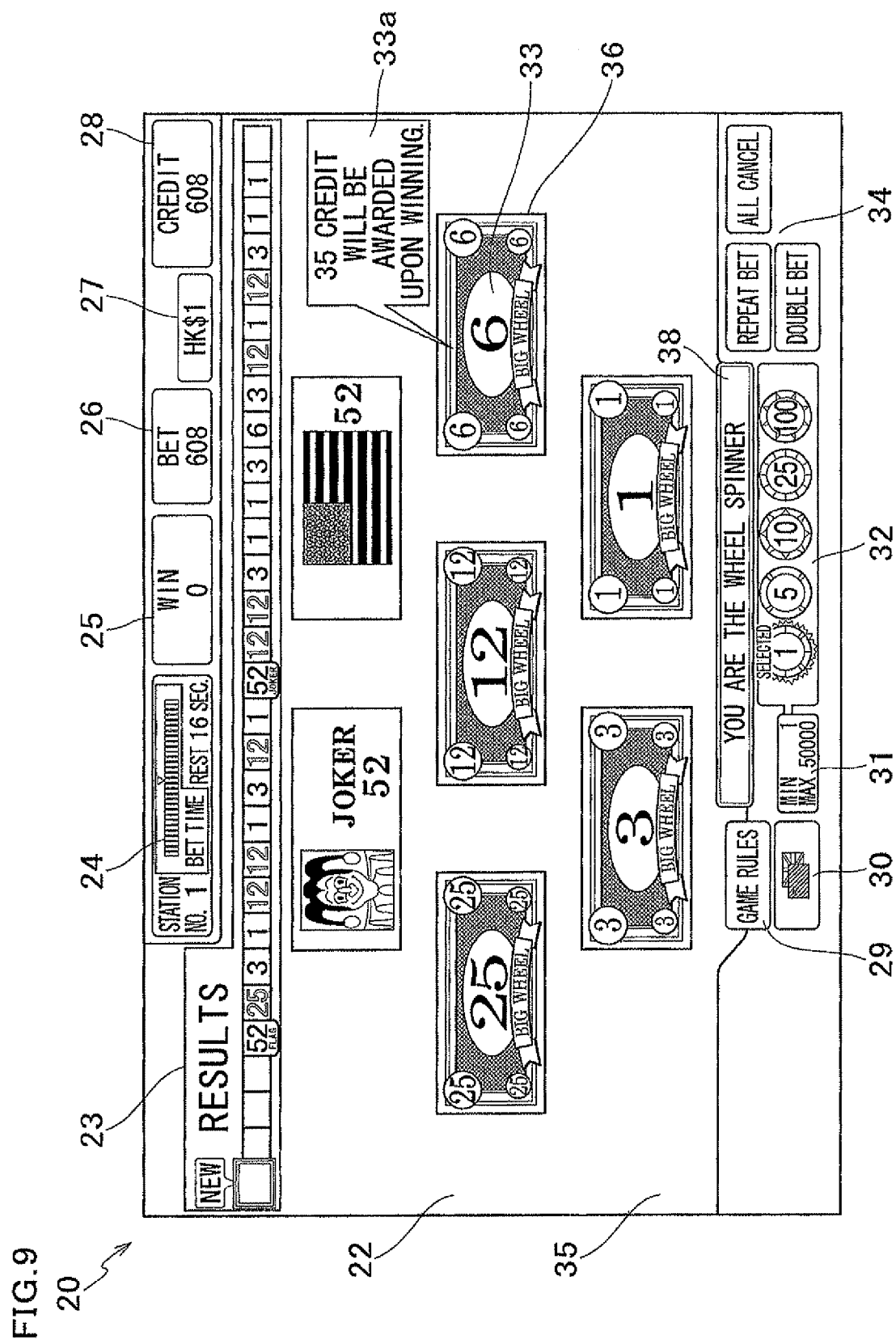
FIG. 9 is a diagram explaining a display mode of the display of the station related to the embodiment of the present invention.

Next, the following describes a display mode of the display 20 provided to the station 10, with reference to FIG. 9. On the front surface of the display 20 is pasted a touch panel 35. Pressing the surface of the touch panel 35 by a finger or the like will operate various buttons.

At the center of the display 20 is displayed a bet screen 22. The bet screen 22 displays bet areas 36 which correspond to the plurality of symbols 21 on the wheel 51, respectively. In the present embodiment, the bet areas 36 with the marks of "1", "3", "6", "12", "25", "JOKER", and "LOGO" are displayed. Further, each of the bet areas 36 has an odds display area 33. For example, in the present embodiment, a bet area 36 corresponding to the symbol of "1" displays its odds of "1", and a bet area 36 corresponding to the symbol of "JOKER" displays its odds of "52". The wording "odds" means the probability of winning the game. The smaller number means a higher possibility of winning the game. Further, the odds also relates to the payout awarded for a game value placed as the bet. For example, when one medal is bet on a symbol "3" whose odds is "3", the player will gain three medals and have four metals all together, if the player wins the game. The amount paid out will be a quadruple of the bet amount. Further, if one medal is bet on a symbol of "JOKER" whose odds is "52", the player will gain 52 medals and will have all together 53 medals if the player wins the game. That is, 53 times of the amount bet will be paid out. Further, in the bet area 36, a popup image 33a indicating the amount of payout in case of winning the game is displayed. The popup image 33a is displayed at the bet area 36 on which a bet is place, when the player places his/her bet. For example, in the case shown in FIG. 9, five medals are bet on a symbol of "6" whose odds is "6". If the player wins the game, 30 medals are gained. In total, 35 metals, i.e., a seven times of the amount bet, are paid out as a credit. This is notified by the popup image 33a. Thus, the player is able to instantly confirm the amount of payout he/she will get upon winning.

Further, below the bet screen 22 are displayed unit bet buttons 32, an acceptable bet amount display area 31, selection buttons 34, a country setting button 30, a rule button 29, and a lever operator notification area 38.

Each of the unit bet button 32 displays the number of medals as a unit to be bet. By dragging to a bet area 36 any of the unit bet buttons 32 while referring to the number shown thereon, the player is able to bet a desirable number of medals on a desirable bet area 36. For example, when the player wishes to bet 35 medals, the player simply has to drag the unit bet button 32 displaying "25" to the bet area 36, and further drag the unit bet button 32 displaying "10" to the same bet area 36. Alternatively, the player may drag seven times the button showing "5" to the bet area 36.

The acceptable bet amount display area 31 displays the minimum and maximum numbers of medals which can be placed as a bet in each game. The selection buttons 34 are buttons for executing various functions. The "REPEAT BET" is a button for placing the same bet placed in the previous game. The "DOUBLE BET" is a button for doubling the number of medals already placed as a bet. "ALL CANCEL" is a button for canceling the bet of medals. The country setting button 30 is a button for changing the language displayed on the display to the language of the set country, and for changing the currency unit being displayed. The rule button 29 is a button for displaying a guidance of the game. The lever operator notification area 38 is displayed only when the lever device 40 of the station 10 is activated so as to notify the player that the player is able to operate the lever device 40.

Above the bet screen 22 are displayed a gaming result display area 23, a bet timer display area 24, a payout amount display area 25, a bet amount display area 26, a currency display area 27, and a credit amount display area 28. The gaming result display area 23 displays the results of the past games. The bet timer display area 24 displays the time for accepting the bet for the next game. The payout amount display area 25 displays the amount of payout awarded to the player in the previous games. The bet amount display area 26 displays an amount of bet entered for a game. The currency display area 27 displays the currency unit. The credit amount display area 28 displays the current credit amount owned by the player. This credit amount is reduced according to the bet amount, and increases according the amount of payout when there is a payout.

Figure 10:
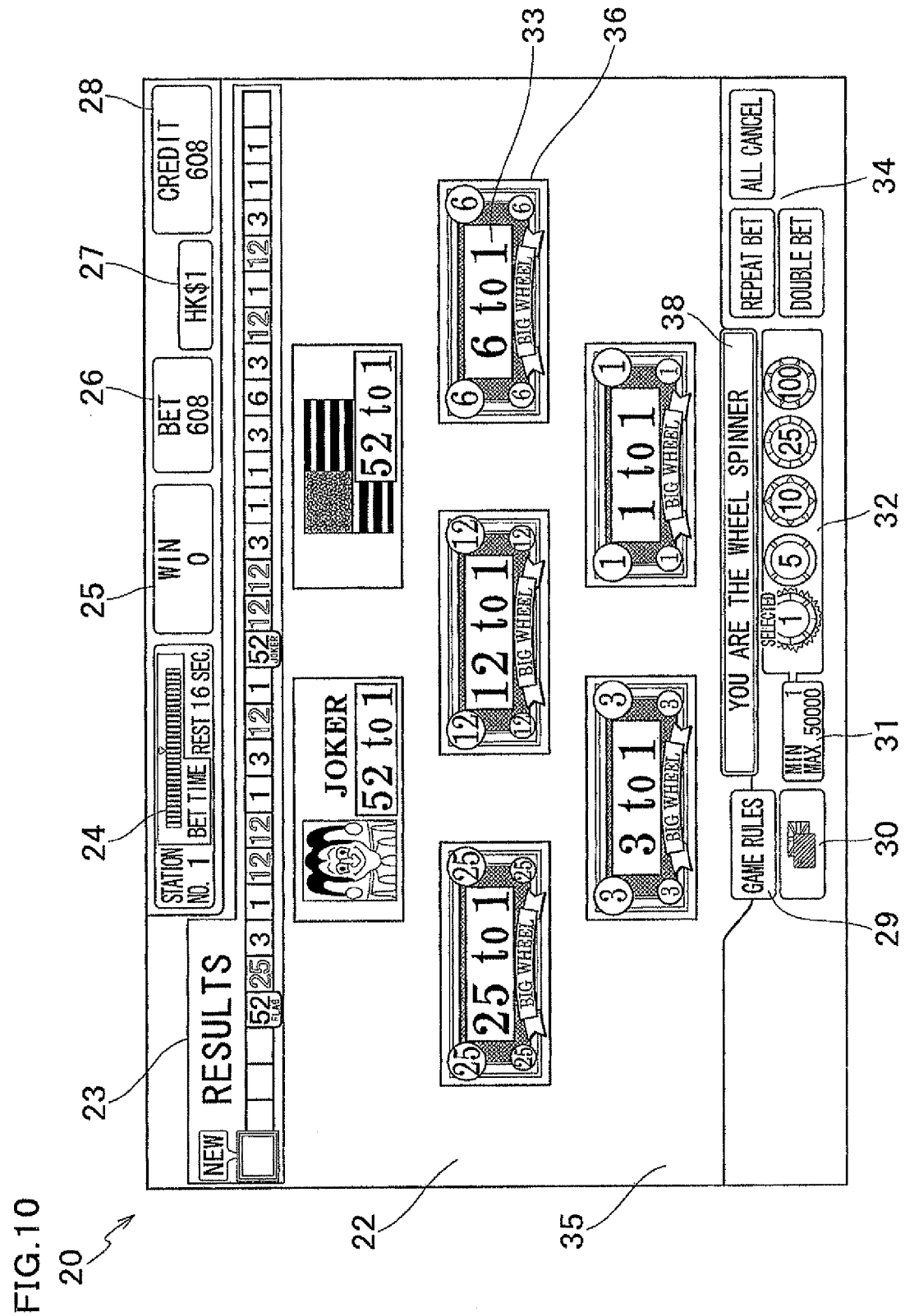
FIG. 10 is an explanatory diagram showing another display mode of the display of the station related to the embodiment of the present invention.

In the present embodiment, the form of displaying the odds on in the odds display area 33 is changed, by pressing the payout display changing button 12 provided to the station 10. For example, as shown in FIG. 10, the odds displayed in the odds display area 33 may be changed to the form of displaying using "to". In other words, when the odds is "3", "3 to 1" is displayed. When the odds is "6", "6 to 1" is displayed. When the odds is "52", "52 to 1" is displayed. For example, when one medal is bet on a symbol of "3" whose odds is "3 to 1", the player will gain three medals and will have in total four medals in total, upon winning. Further, when one medal is bet on a symbol of "JOKER" whose odds is "52 to 1", the player will gain 52 medals and will have 53 medals in total upon winning. As described, the form of displaying the odds on the display 20 of the station 10 is switchable. Therefore, the form of displaying can be adjusted to a form that is easiest to see for the players while playing the game.

(Internal Structure of Gaming Machine)

Figure 11:
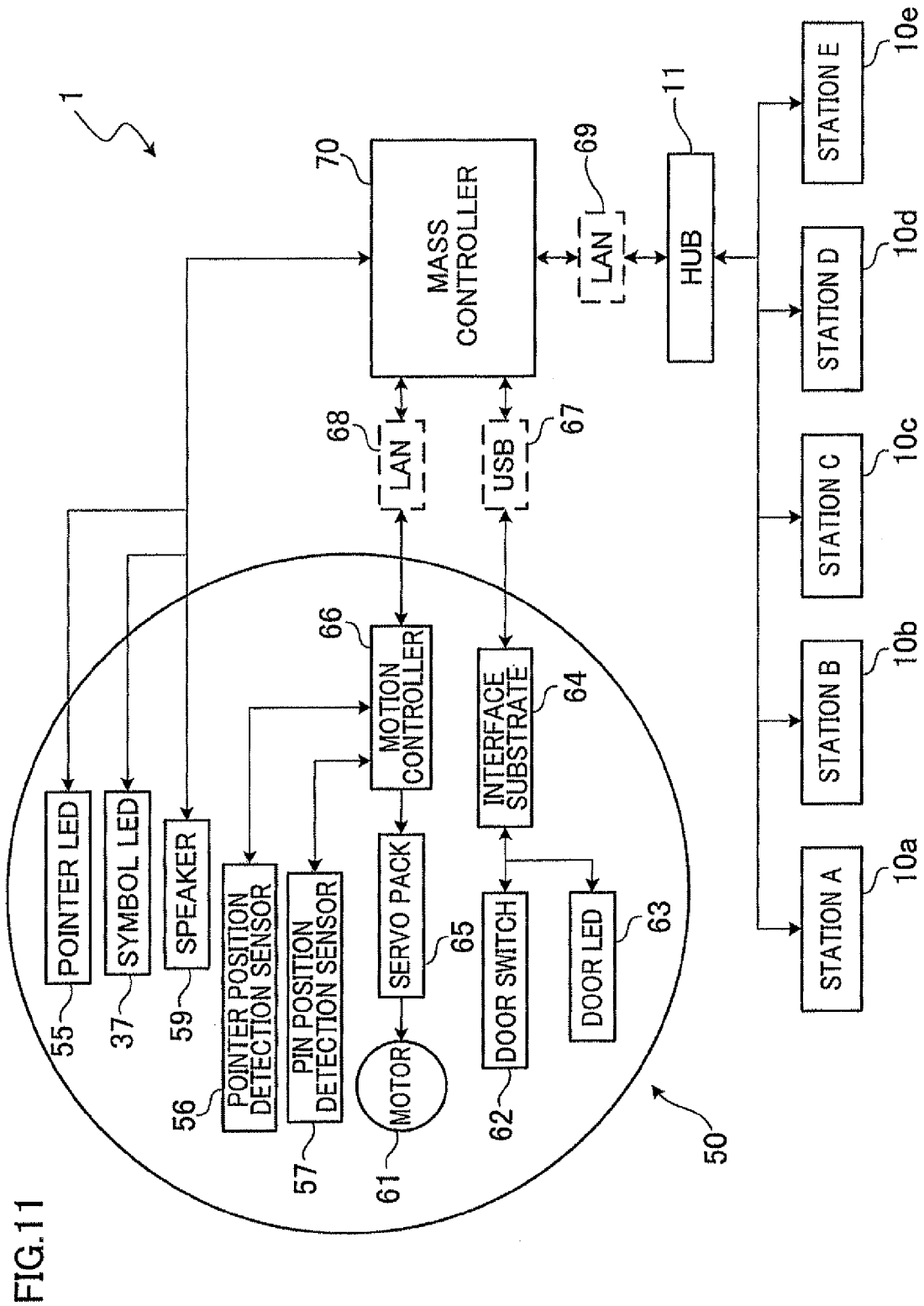
FIG. 11 is an explanatory diagram showing an electric structure of the gaming machine related to the embodiment of the present invention.

Next the following describes an internal structure of the gaming machine 1 of the present embodiment. As shown in FIG. 11, the gaming machine 1 has the roulette device 50, the mass controller 70, and the plurality of stations 10 (10a, 10b, 10c, 10d, 10e). The roulette device 50 and the mass controller 70 are connected to each other and are in communication with via a LAN 68 and USB 67. The plurality of stations 10 are connected to and in communication with the mass controller 70 via the LAN 69 and the HUB 11.

The roulette device 50 has a door switch 62 and a door LED 63, and is connected to the mass controller 70 via the interface substrate 64 and the USB 67. Through the control performed by the mass controller 70, the door switch 62 is unlocked, and the door LED 63 is turned on and off.

Further, the roulette device 50 has the motion controller 66, a servo pack 65, the motor 61, the pointer position detection sensor 56, and the pin position detection sensor 57. The motion controller 66 determines the rotation speed of the wheel 51, under the control of the mass controller 70, and controls the servo pack 65 to drive the motor 61. Specifically, the motion controller 66 controls the rotation of the wheel 51, by calculating and determining a later-mentioned speed curve of the wheel 51 shown in FIG. 20 which includes an acceleration period, a constant speed period, a first deceleration period, a second decelerate period, based on the maximum rotation speed of the wheel 51 determined by the mass controller 70 and the rotation angle to the winning position. The motor 61 is connected to the wheel 51, and is driven to rotate the wheel 51. By changing the rotation count of the motor 61, the rotation speed of the wheel 51 is varied. By changing the rotation direction of the motor 61, the rotation direction of the wheel 51 is changed. The pointer position detection sensor 56 detects the period between the emission of the laser beam 56a to the pointer 53 of the wheel 51 and the point when the laser beam 56a returns. The detected information is transmitted to the mass controller 70 via the motion controller 66, to determine the tilt of the pointer 53. The pin position detection sensor 57 emits a laser beam 57a to the pin 54 of the wheel 51 to detect the position of the pin 54. The detected information is transmitted to the mass controller 70 via the motion controller 66 to determine the rotation angle or the like of the wheel 51.

Further, the roulette device 50 has the pointer LED 55, the symbol LEDs 37, and a speaker 59. The pointer LED 55 lights up the pointer 53, under the control of the mass controller 70. The symbol LED 37 lights up the symbols 21, under the control of the mass controller 70. The speaker 59 outputs a sound effect, under the control of the mass controller 70.

Figure 12:
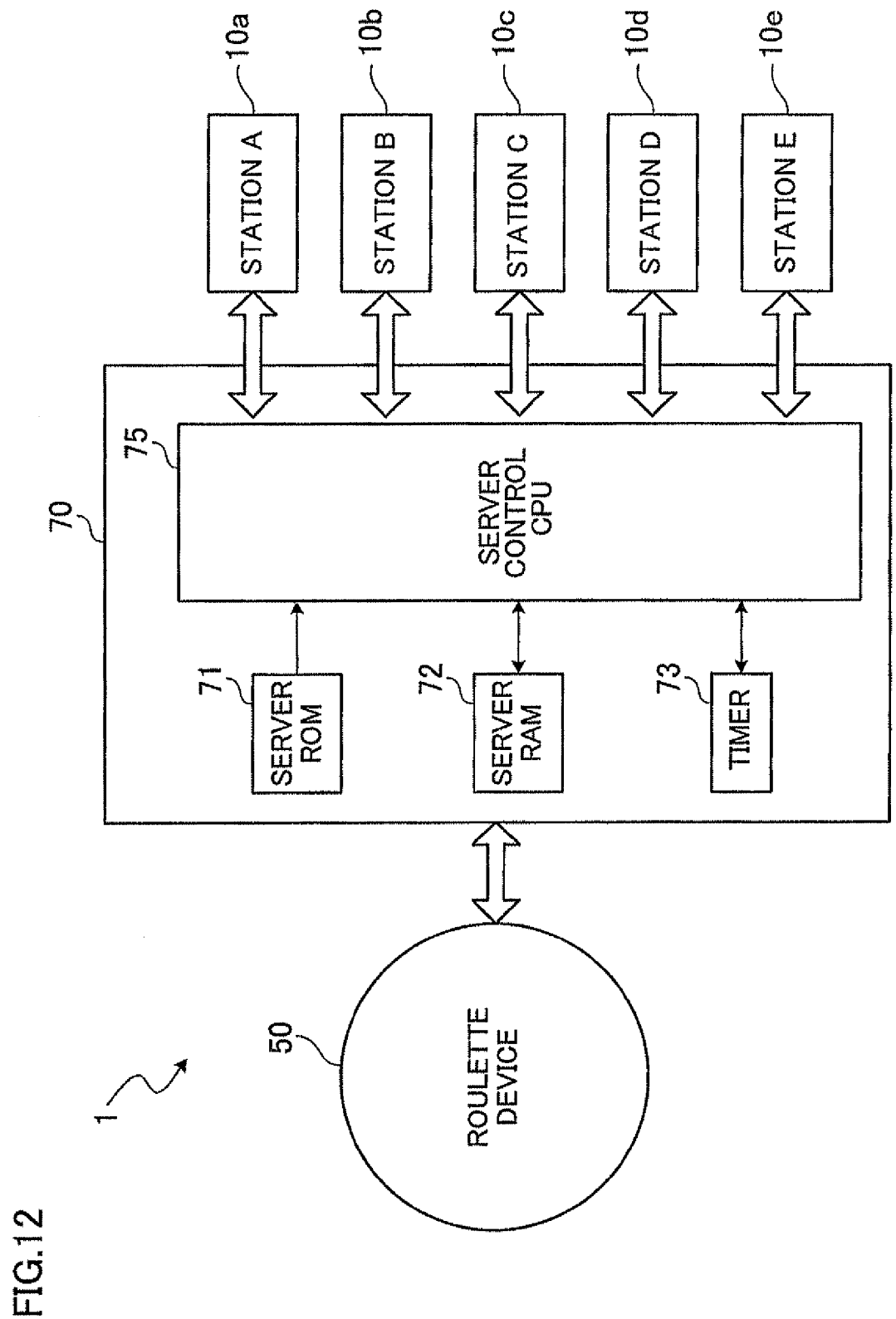
FIG. 12 is an explanatory diagram showing the internal structure of a mass controller of the gaming machine related to the embodiment of the present invention.

As shown in FIG. 12, the mass controller 70 has a server control. CPU 75, a server ROM 71, a server RAM 72, and a timer 73. The server control CPU 75 has at least the functions of the lever operator determination unit 702 of FIG. 2, the wheel rotation speed random determination unit 703, the resulting symbol random determination unit 715, the wheel rotation speed curve adjusting unit 704, the wheel stop-effect pattern random determination unit 705, the game running unit 708, the pin position determination unit 707, the pointer position determination unit 706, a winning determination unit 709, and lever activating unit 712. The server ROM 71 stores programs of various functions to be executed by the server control CPU. The server RAM 72 has at least the functions of the bet information storage 701 of FIG. 2, the rotation speed data storage 713, and the rotation count table storage 714, and stores a station managing table of FIG. 16, a wheel rotation speed table of FIG. 17, a wheel stop-effect pattern table of FIG. 18, a payout pattern table of FIG. 19, rotation speed data, or the like. The timer 73 has a function of the bet period measurement unit 711 of FIG. 2, and measures the bet period of each station 10.

Figure 13:
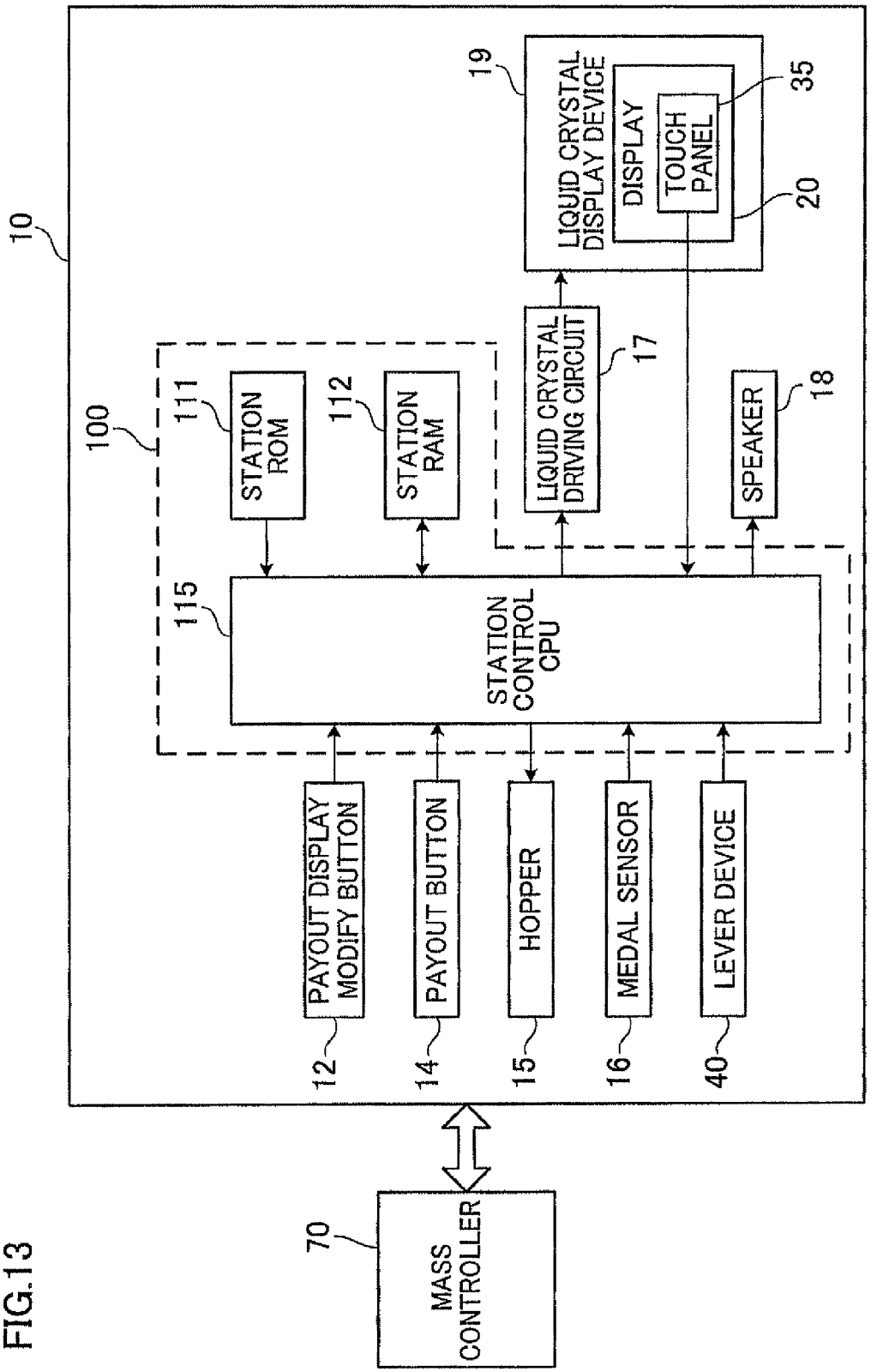
FIG. 13 is an explanatory diagram showing the internal structure of the station related to the embodiment of the present invention.

As shown in FIG. 13, the station 10 has the station controller 100, the liquid crystal display device 19, the payout display changing button 12, a payout button 14, a hopper 15, a medal sensor 16, the lever device 40, and the speaker 18.

The station controller 100 has a station control CPU 115, a station ROM 111, and a station RAM 112. The station control CPU 115 has at least the functions of the bet information receiving unit 101 of FIG. 2, the lever activating unit 109, the lever speed measurement/determination unit 103, the payout determination unit 107, the resulting number effect determination unit 106, and the payout display content changing unit 105. The station ROM 111 stores programs of various functions to be executed by the station control CPU 115. The station RAM 112 has at least the functions of the bet information storage 102 of FIG. 2, and the lever speed information storage 104, and stores bet information managing table of FIG. 14 and the lever operation time table of FIG. 15.

The liquid crystal display device 19 is connected to the station control CPU 115 via a liquid crystal driving circuit 17, and displays an image under control of the station control CPU 115. Further, the liquid crystal display device 19 has the display 20, and the display 20 has on its front surface the touch panel 35. The information of operating the touch panel 35 is processed by the station control CPU 115.

The payout display changing button 12 is a button which changes the form of displaying the odds displayed in the odds display area 33 on the display 20, when pressed by the player. The payout button 14 is a button for paying out the game medium such as medals, when pressed by the player. The hopper 15 pays out, from a payout port, a predetermined number of medals, under control of the station control CPU 115. The medal sensor 16 detects the medals input from the medal insertion slot, and calculates the medals input. The result of calculation is transmitted to the station control CPU 115. The lever device 40 is a device which rotates the wheel 51 upon operation by the player. The speaker 18 outputs a sound effect related to the game under control by the station control CPU 115.

(Bet Information Managing Table)

Next, the following describes a bet information managing table provided to the station 10 of the present embodiment, with reference to FIG. 14. The bet information managing table is stored in the station RAM 112 and stores therein the bet information of a bet entered by the player. The bet information managing table has a bet type column and a bet amount column, and a bet amount is stored for each bet type. The table also stores, for each bet type, a total bet amount which is a total of the bet amounts. Note that bet type correspond to the type of bet area 36 displayed 20, which corresponds to the symbol 21. That is, as the bet type, there are "1", "3", "6", "12", "25", "JOKER", and "LOGO". For example, in cases of FIG. 14, a bet amount "5" is stored in the row of bet type "1", a bet amount "25" is stored in the row of bet type "3", and a bet amount "10" is stored in the row of bet type "JOKER". Then, in the row of total bet amount, a bet amount "40" which is the total of all the bet amounts is stored. As described, the bet information on a game is managed for each station 10.

(Lever Operation Time Table)

Next, the following describes a lever operation time table provided to the station 10 of the present embodiment, with reference to FIG. 15. The lever operation time table includes a lever operation period column and a speed level column. The lever operation period column stores an operation period of the lever device 40. In other words, the lever operation period column stores therein the time taken for the projection 48 to move from the start point sensor 45 to the midpoint sensor 46, when the lever 41 of the lever device 40 is operated. The speed level column on the other hand stores a speed level corresponding to the lever operation period. For example, in the case of FIG. 15, the speed level "Slow" is stored for the lever operation period "-5 msec". Similarly, the speed level "Normal" is stored for the lever operation period "6-9 msec". The speed level "Fast" is stored for the lever operation period "10 msec-". Note that the speed levels for the lever operation period are not limited to those described above, and are suitably settable.

(Station Managing Table)

Next, the following describes a station managing table provided in the mass controller 70 of the present embodiment, with reference to FIG. 16. The station managing table includes a station column, a bet type column, a total bet amount column, and a lever operator column. The station column stores therein the names of the stations 10 (10a, 10b, 10c, 10d, 10e) connected to the mass controller 70. The bet type column stores, for each bet type, a bet amount received from each station 10. The total bet amount column stores the total value of the bet amount received from each station 10. The lever operator column stores information indicating whether the lever device 40 is active or inactive. For example the bet information stored in the bet information managing table of FIG. 14 is stored, in the row of station a in FIG. 16. As described, the station managing table collectively stores the bet information stored in the bet information managing table of each station 10. In the row of station c whose total bet amount is "55", a flag "1" is stored in the lever operator column. The station 10 with the flag "1" in its lever operator column has its the lever device 40 activated. On the other hand, the lever devices 40 of the other stations 10 whose lever operator columns stores a flag "0" are inactive. As described, the lever device 40 of the station 10 through which the largest amount of bet is placed is activated. This motivates the player to bet more than the others to win the right to operate the lever device 40 for rotating the wheel. This contributes to heating up the game, and further improves the entertainment characteristic of the game.

As the condition for having the flag "1" stored in the lever operator column, a predetermined sequence may be determined, and the flag "1" may be stored in the lever operator column of each station 10 according to the predetermined sequence. With this, the right to operate the lever device 40 for rotating the wheel 51 is rotated to each station 10. This contributes to the reduction of the possibility that the player trying to operate the lever device 40 while it is not his/her turn and consequently damaging or deteriorating the lever device 40.

Additionally, the conditions for storing the flag "1" in the lever operator column may include a condition that the flag "1" will not be stored in the lever operator column of a station 10 whose bet amount falls short of a predetermined amount. With this, the lever device 40 cannot be operated if the amount of bet entered falls short of a predetermined amount of game value. This motivates the player to bet at least the predetermined amount of game value to operate the lever device 40. As the result, the gaming machine 1 has an improved cost performance. Further, since the player who has not yet bet the predetermined amount of game value is not able to operate the lever device 40, the right for operating the lever device 40 will not be given to a vacant station 10, nor will it be given to the player who has not participated into the game.

(Wheel Rotation Speed Table)

Next, the following describes a wheel rotation speed table provided in the mass controller 70 of the present embodiment, with reference to FIG. 17. The wheel rotation speed table includes a speed level column and an initial rotation speed column. The speed level column stores the same information as the information of the speed level column in the lever operation time table of FIG. 15. The initial rotation speed column stores an initial rotation speed of the wheel 51 for each speed level. For example, in case of FIG. 17, two initial rotation speeds "8 rpm" and "9 rpm" are stored for the speed level of "Slow". Further, initial rotation speeds "10 rpm" and "11 rpm" are stored in the speed level of the "Normal". The initial rotation speeds "12 rpm" and "13 rpm" are stored in the speed level of "Fast". These pieces of information are used for randomly determining the initial rotation speed of the wheel 51 for the operation period of the lever device 40 having been operated at the station 10. Note that the initial rotation speeds for the above mentioned speed levels are not limited to those, and are suitably settable.

As described, the wheel 51 rotates at a rotation speed corresponding to the operation period of the lever device 40 for rotating the wheel 51. Therefore, the rotation speed of the wheel 51 is not the same every time the wheel 51 is rotated. When compared with a gaming machine 1 in which the wheel 51 rotates in the same manner all the time, the above gaming machine 1 provides an improved entertainment characteristic which more likely keeps the enthusiasm of the players to the game, without causing them to get board of the game.

(Wheel Stop-Effect Pattern Table)

Next, the following describes the wheel stop-effect pattern table provided to the mass controller 70 of the present embodiment, with reference to FIG. 18. The wheel stop-effect pattern table includes a stop position column and a wheel-stop determination column. The stop position column stores the ten stop positions from "1" to "10". In other words, as shown in FIG. 4, the stop position column stores the ten stop positions of the spot 52 with the resulting symbol. The wheel-stop determination column stores a flag indicating "1" or "0". When the flag in the wheel-stop determination column indicates "1", the rotation of the wheel 51 is stopped so that the pointer 53 points at the stop position with the flag indicating "1". Whether or not the flag indicating "1" is stored in the wheel-stop determination column is randomly determined by the mass controller 70. For example, in the case of FIG. 18, the flag "1" is stored in the wheel-stop determination column of the stop position "10". In this case, there is provided an effect which makes it look as if the pointer 53 will reach the symbol 21 subsequent to the resulting symbol. The number of stop positions is not limited to ten, and is suitably settable.

(Payout Pattern Table)

Next, the following describes a payout pattern table provided in the mass controller 70 of the present embodiment, with reference to FIG. 19. The payout pattern table includes a symbol column, a spot number column, a probability column, an odds column, a payout rate column. The symbol column stores the names of various symbols. The spot number column stores, for each type of symbols 21, the number of spots on the wheel 51 with the symbol 21. The probability column stores the probability of having the corresponding symbol selected as a resulting symbol through a random determination. The odds column stores the odds for each symbol 21. The payout rate column stores a payout rate for each symbol 21. The payout rate is an amount of payout awarded for the amount invested by a player, which is expressed in a percentage. Higher the payout rate, the higher the amount of the payout to the player, which is more advantageous to the player. In the present embodiment, there are three types of payout pattern tables: type A to type C. The payout rates in these tables are changed by changing the odds. For example, in type A of FIG. 19A, the odds for the symbols of "JOKER" and "LOGO" are "53", and the total payout rate is 96.032%. On the other hand in type B of FIG. 19B, for example, the odds for the symbols of "JOKER" and "LOGO" are "52", and the total payout rate is 95.503%. As is understood from this, the total payout rate is smaller in type B than type A. As described, the payout rate is suitably settable from the highest rate of 96.032% in the payout pattern table of type A to the lowest rate of 94.974% in the payout pattern table of type C, by changing the odds for the symbols 21. These payout pattern tables may be set by an operator or changed and set as needed by the mass controller 70 every time the game is run a predetermined number of times. In the present embodiment, the payout rate is adjusted by changing the odds for "JOKER" and "LOGO". The payout rate may be adjusted by changing the odds for the other symbols 21. As described, the payout rate is adjustable by changing the odds. For example, by adjusting the payout rate according to the operation rate of the gaming machine 1, the operation rate of the gaming machine 1 could be effectively improved.

Further, in the present embodiment, the payout rate is changed by changing the odds as in the case of the payout pattern table of FIG. 19. The payout rate however may be changed by changing the number of symbols 21. For example, in the present embodiment, the number of symbols "1" is 26, the number of symbols "3" is 13, the number of symbols "6" is 7, and the number of symbols "12" is 4, the number of symbols "25" is 2, and the number of symbols "JOKER" is 1 and the number of "LOGO" is 1. Although these numbers are fixed, the payout rate may be adjusted by changing these numbers. As described, with the gaming machine 1 of the present embodiment, the payout rate is adjustable by changing the number of symbols 21. For example, by adjusting the payout rate according to the operation rate of the gaming machine 1, the operation rate of the gaming machine 1 could be effectively improved.

(Exemplary Rotation Speed Curve)

Figure 20:
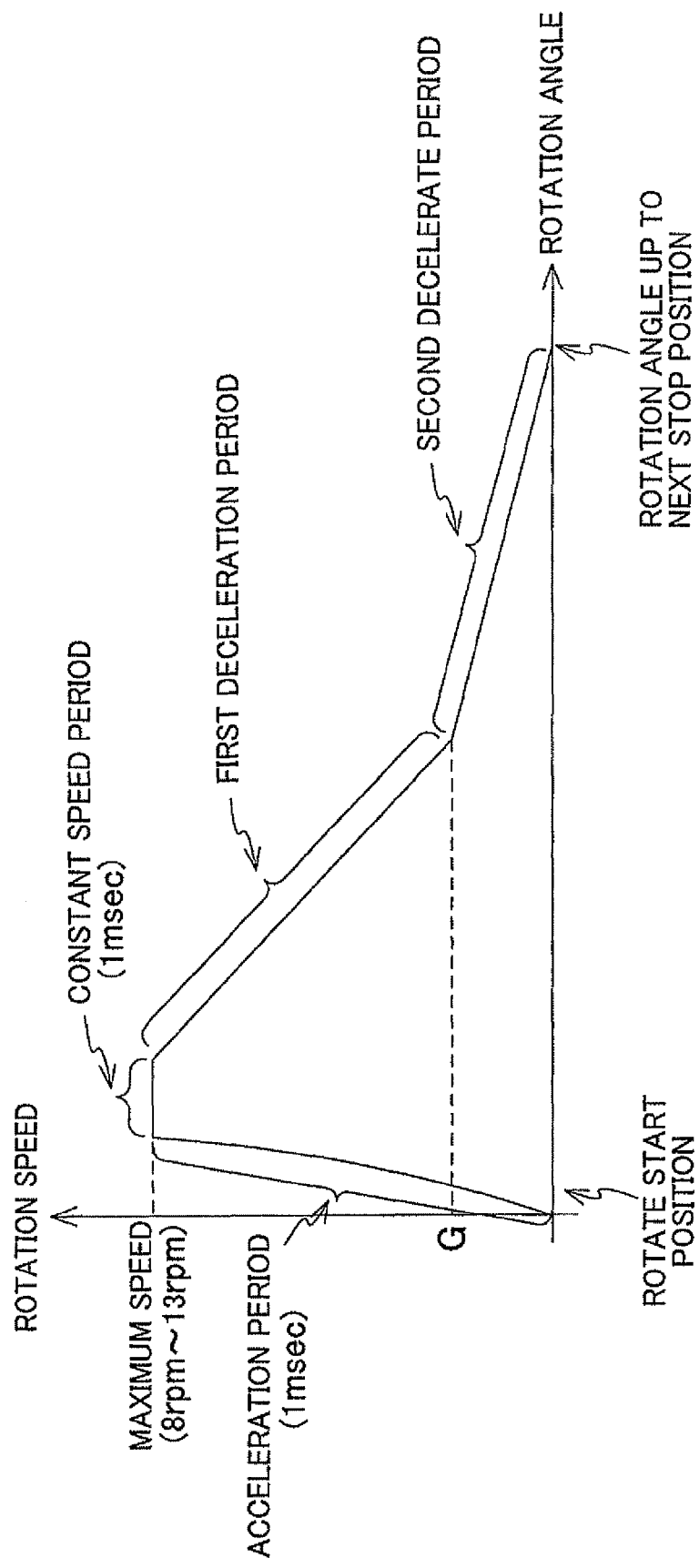
FIG. 20 is an explanatory diagram showing an exemplary rotation speed curve of the wheel related to the embodiment of the present invention.

Next, the following describes, with reference to FIG. 20, an exemplary rotation speed curve of the wheel 51 which is determined by the motion controller 66 under control of the mass controller 70 of the present embodiment. In FIG. 20 showing the rotation speed curve, the horizontal axis represents the rotation angle of the wheel 51, while the vertical axis represents the rotation speed of the wheel 51. The rotation angle of the wheel 51 means an angle by which the wheel 51 rotates. When the wheel 51 makes one rotation, the rotation angle is 360. As shown in FIG. 21, when the wheel 51 of the present embodiment starts rotating, the rotation of the wheel 51 reaches the maximum speed B in 1 msec of an acceleration period. The initial rotation speed during the acceleration period is a speed corresponding to the operation period of the lever device 40 of the station 10 which is determined from the plurality of the stations 10 based on the bet information or the like. In short, the initial rotation speed is a speed determined by referring to the wheel rotation speed table of FIG. 17 or the like. Since the time (1 msec) to reach the maximum speed B=S-shaped control time (set to 500 msec)+acceleration time, the acceleration C in the acceleration period is as shown in the following (Equation 1).

$$C = B*2 \qquad \text{(Equation 1)}$$

where C is the acceleration in the acceleration period, B is the maximum speed.

Note that the maximum speed B=8 rpm to 13 rpm. This maximum speed is set in consideration of the initial rotation speed. The rotation of the wheel 51 having reached the maximum speed B enters the constant speed period of 1 msec, and then transits to the first deceleration period to be rapidly decelerated. Note that the rotation angle D by which the wheel 51 rotates in the acceleration period and the constant speed period is found by the following (Equation 2) using the formula for linear motion of acceleration.

$$D = \frac{1}{2} * C + B \quad \text{(Equation 2)}$$

where D is the rotation angle in the acceleration period and the constant speed period, C is acceleration in the acceleration period, and B is the maximum speed.

The first deceleration period is a period in which the wheel 51 is rapidly decelerated when there is only a half round left before reaching the stop position. The rotation angle Y by which the wheel 51 rotates during this period is found by the following (Equation 3) using the formula for linear motion of acceleration.

$$Y = A - D - \text{the distance of a half round} \quad \text{(Equation 3)}$$

where A is the rotation angle from the start of the rotation of the wheel 51 to the point where the wheel 51 stops, D is a rotation angle in the acceleration period and the constant speed period, and Y is the rotation angle of the first deceleration period.

The deceleration 1 in the first deceleration period is found by the following (Equation 4) using the formula for linear motion of acceleration.

$$\text{Deceleration } 1 = (X^2 - B^2)/(2*Y) \quad \text{(Equation 4)}$$

where X is the rotation speed at the end of the first deceleration period, B is the maximum speed, and Y is the rotation angle in the first deceleration period.

When the first deceleration period ends, the rotation of the wheel 51 enters the second decelerate period during the remaining half round. The wheel 51 is decelerated more gradually than the deceleration 1 in the first deceleration period, and then stopped at a predetermined stop position. The deceleration 2 in the second decelerate period is found by the following (Equation 5) using the formula for linear motion of acceleration.

$$\text{Deceleration } 2 = X^2/(2*360*3) \quad \text{(Equation 5)}$$

where X is the rotation speed at the end of the first deceleration period.

The above equation is calculated by a formula for linear motion of acceleration shown in the following (Equation 6).

$$v = v_0 + a*t$$

$$s = v_0*t + (\frac{1}{2})*a*t^2$$

$$v^2 - v_0^2 = 2*a*s \quad \text{(Equation 6)}$$

where v is the velocity, $v_0$ is the initial velocity, a is the acceleration, t is the time, and s is the distance.

The rotation speed of the wheel 51 is controlled and adjusted by the mass controller 70 as described hereinabove. Thus, the rotation speed of the wheel 51 is accelerated and decelerated within a predetermined period. Therefore, when compared with a gaming machine 1 in which the wheel 51 rotates at a constant speed, the above gaming machine 1 provides an improved entertainment characteristic that more likely keeps the enthusiasm of the players to the game, without causing them to get board of the game. Further, the rotating wheel 51 is rapidly decelerated once, and then is gradually decelerated and stopped. Thus, even when a large wheel 51 which generates a large inertia is adopted, the wheel 51 is gradually stopped in a short period. This improves the operation rate of the gaming machine 1.

The number of rotations of the wheel 51 can be set in advance. For example, the wheel 51 is stopped after rotating at least the number of times provided by each nation; stopping after rotating at least two times, or the like. Further, it is possible to rotate the wheel 51a predetermined number of times. Therefore, for example, if the wheel 51 needs to be rotated at least three times according to a national regulation, the wheel 51 is stopped after the rotating at least three times, and if the wheel 51 needs to be rotated at least twice, according to a national regulation, the wheel 51 is stopped after rotating at least twice. As is understood from this, the number of rotations of the wheel 51 is freely adjustable. Therefore, it is possible to speed up the game in some countries.

(Station Side Game Process)

Next, the following describes a station side game process executed in the station controller 100, with reference to FIG. 21. As shown in FIG. 21, first the station controller 100 determines whether or not a game medium such as a medal has been input from the medal insertion slot or the like of the station 10 (S11). When it is determined that no medal has been input, the station controller 100 waits for an input of a medal. On the other hand, if it is determined that a medal has been input, the station controller 100 adds the amount of credit corresponding to the medal (S12). Then, the station controller 100 transmits to the mass controller 70 a medal detection signal indicating an input of a medal (S13).

Then, the station controller 100 displays a bet screen 22 as shown in FIG. 9 on a display 20 of the station 10, and displays a bet time for accepting player's bet in the bet timer display area 24 (S14). The station controller 100 then executes a bet operation receiving process for receiving a bet operation from the player (S15). Thus, the player participating in the game is able to place a bet during the bet time for accepting the bet. When a bet from the player is received, the station controller 100 transmits, to the mass controller 70, bet information related to the bet area 36 on which the bet is placed and the bet amount placed thereon as the bet information signal (S16). After that, the station controller 100 determines whether or not a bet period end signal notifying the end of the bet period is received from the mass controller 70 (S17). When it is determined that no bet period end signal is received, the station controller 100 waits for a bet operation by the player. On the other hand, if it is determined that the bet period end signal has been received, the station controller 100 sets the bet time displayed in the bet timer display area 24 to zero, and ends the reception of a bet operation by the player.

Next, the station controller 100 determines whether or not a lever operator signal has been received from the mass controller 70 (S19). When it is determined that no lever operator signal is received from the mass controller 70, the station controller 100 shifts the process to S23. On the other hand, if it is determined that the lever operator signal is received, the station controller 100 unlocks the lever device 40. That is, the lever device 40 is activated (S20). After that, the station controller 100 determines whether or not the player has operated the lever device 40 (S21). When it is determined that the lever device 40 has not been operated, the station controller 100 waits for the operation of the ever device 40. On the other hand, when it is determined that the player has operated the lever device 40, the station controller 100 measures the operation period of the lever device 40. That is, the station controller 100 measures the time taken for the projection 48 of the lever device 40 to move from the start point sensor 45 to the midpoint sensor 46, when the lever device 40 is operated by the player. Then, based on the operation period measured, the station controller 100 determines the speed level referring to the lever operation time table of FIG. 15, and transmits the lever speed signal including information related to the speed level to the mass controller 70 (S22).

After that, the station controller 100 determines whether or not a result signal including information related to the result is received from the mass controller 70 (S23). When it is determined that no result signal is received from the mass controller 70, the station controller 100 waits for the result signal. On the other hand, when it is determined that the result signal is received, the station controller 100 determines an effect for notifying the resulting number or the like based on the result information included in the result signal, and notifies the resulting number or the like to the player through the liquid crystal display device 19 and the speaker 18 (S24). Then, the station controller 100 pays out the credit based on the result information (S25), waits for the end of the unit game (S26). Then, when a unit game end signal is received from the mass controller 70, this routine is ended.

(Mass Controller Side Game Process)

Figure 22:
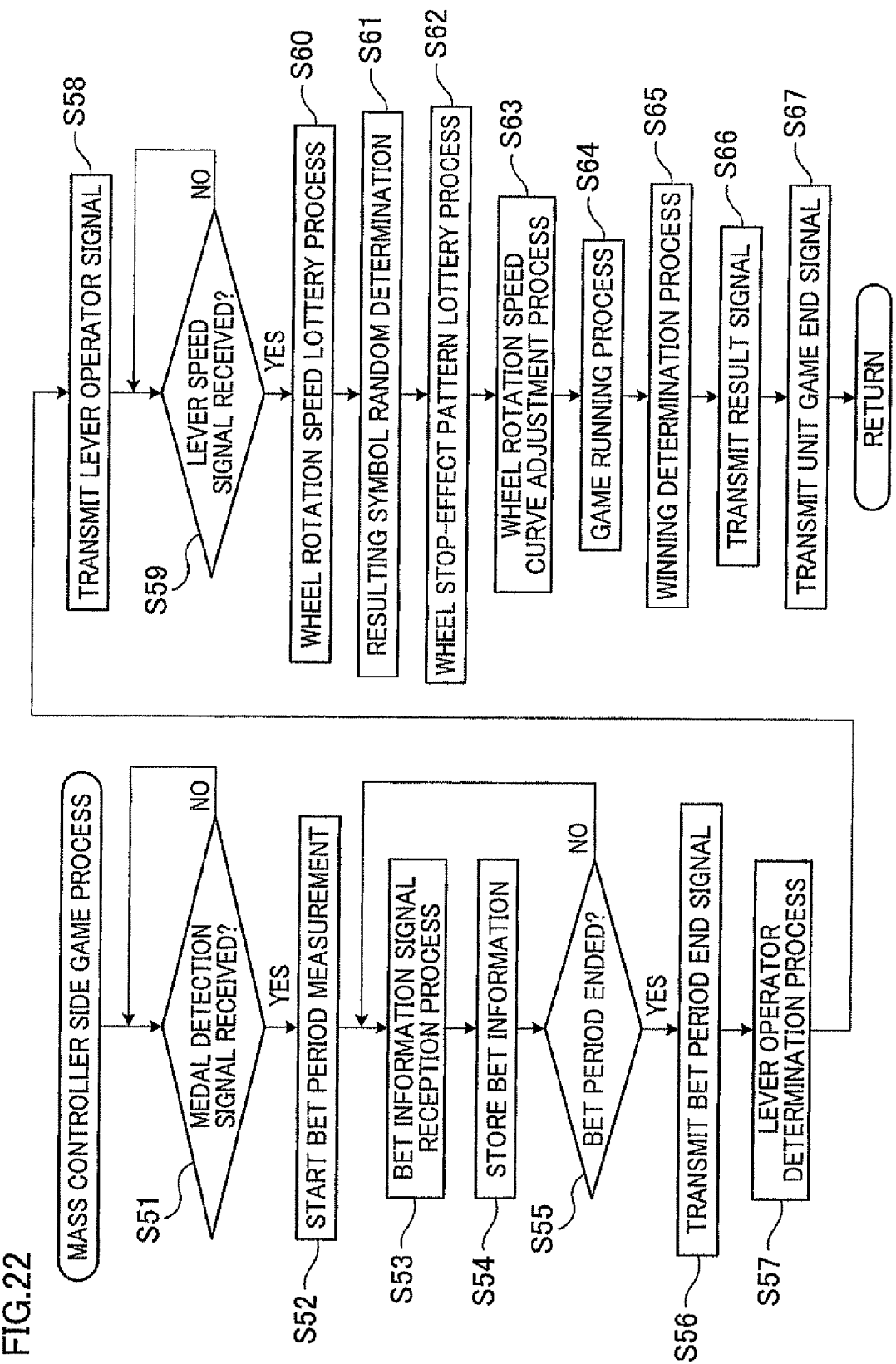
FIG. 22 is a flowchart of the mass controller side game process which is executed by a mass controller related to the embodiment of the present invention.

Next, the following describes a mass controller side game process executed in the mass controller 70, with reference to FIG. 22. As shown in FIG. 22, first, the mass controller 70 determines whether or not a medal detection signal is received from any of the stations 10 (10a, 10b, 10c, 10d, 10e) (S51). When it is determined that no medal detection signal is received, the mass controller 70 waits for reception of the medal detection signal. On the other hand, when it is determined that the medal detection signal is received, the mass controller 70 starts measurement of the bet period (S52).

Next, the mass controller 70 executes the bet information signal reception process for receiving a bet information signal from the station 10 (S53). Then, the mass controller 70 stores the bet information in the station managing table of FIG. 16 based on the bet information signal received (S54). After that, the mass controller 70 determines whether or not the bet period has ended (S55). When it is determined that the bet period is not ended, the mass controller 70 executes again the bet information signal reception process. On the other hand, when it is determined that the bet period is ended, the mass controller 70 transmits a bet period end signal to the station 10 (S56).

Next, the mass controller 70 executes the lever operator determination process (S57). Through the process, the mass controller 70 determines the station 10 to be the lever operator, referring to the bet information stored in the station managing table of FIG. 16. Then, the mass controller 70 transmits the lever operator signal to the station 10 to be the lever operator (S58).

Next, the mass controller 70 determines whether or not a lever speed signal is received (S59). When it is determined that no lever speed signal is received, the mass controller 70 waits for the lever speed signal. On the other hand, when it is determined that the lever speed signal is received, the mass controller 70 executes a wheel rotation speed random determination process (S60). Through this process, the mass controller 70 determines the initial rotation speed of the wheel 51 by referring to the wheel rotation speed table of FIG. 17. That is, the mass controller 70 randomly determines the initial rotation speed, based on the lever speed signal received from the station 10 in which the lever device 40 has been operated. Next, the mass controller 70 executes a resulting symbol random determination process to randomly determine a resulting symbol from the plurality of symbols 21 (S61).

Next, the mass controller 70 executes a wheel stop-effect pattern random determination process (S62). Through this process, the mass controller 70 determines the stop effect of the wheel 51, by referring to the wheel stop-effect pattern table of FIG. 18. That is, the mass controller 70 randomly determines the point position (i.e., stop position) of the pointer 53 in the spot 52 with the resulting symbol, and determines the rotation angle of the wheel 51 based on the pointing position thus determined. Further, at the same time, the mass controller 70 also determines the rotation angles for the pins 54 which contact the pointer 53, before the wheel 51 stops. Then, the mass controller 70 executes a wheel rotation speed curve adjustment process (S63). Through this process, the mass controller 70 controls the motion controller 66, and determines the rotation speed curve of the wheel 51 within a predetermined period, based on the rotation speed data.

After that, the mass controller 70 executes a game running process, to rotate and stop the wheel 51 (S64). Then, the mass controller 70 executes a winning determine process based on the resulting symbol (S65), and transmits a result signal including the result information to the station 10 (S66). After that, the mass controller 70 ends the unit game, transmits the unit game end signal to each station 10 (S67), and ends the routine.

Through the above described operation of the gaming machine 1, the wheel 51 used in the game is automatically rotated or stopped by controlling the mass controller 70. Thus, unlike a simple roulette game, various effects can be provided to the game, and the entertainment characteristic of the game is improved. The wheel 51 used in the game is also rotatable by having the player operate the lever device 40 provided to the station 10. Since the game can be started by a hand of the player, the player may feel more involved in the game and become more enthusiastic about the game. Further, since only the player of one station 10 among the plurality of stations 10 is able to operate the lever device 40, the player who can operate the lever device 40 feels he/she is more advantaged than the other players. This makes the operation of the lever device 40 very attractive to the players, and as a result, the entertainment characteristic of the game is improved.

The embodiment of the present invention, described hereinabove, is solely to serve as an example of the present invention, and is not at all intended to limit the present invention. It is obvious for a person with ordinary skill in the art that the specific structures of the means may be suitably designed and altered as needed. Further, the effects described in the embodiment of the present invention are no more than examples of most preferable effects yielded by the present invention, and the effects of the present invention are not limited to those described in the embodiment of the present invention.

For example, in the gaming machine 1 of the present embodiment, the wheel 51 of the roulette device 50 is set upright. The wheel 51 however may be set horizontally, as long as the players playing the game on the plurality of stations 10 are able to see the symbols 21 on the wheel 51.

Further, in the gaming machine 1 of the present embodiment, the form of displaying the odds in the odds display area 33 is changed by pressing the payout display changing button 12 provided to the station 10. The present invention however is not limited to this. For example, the form of displaying the odds may be changed by controlling the operation of the mass controller 70 and the station controller 100. Further, the form of displaying is not limited to the form using "to"; i.e., "2 to 1", "51 to 1". Other forms of displaying are also possible.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

The present invention is applicable to a gaming machine which awards a payout to the resulting symbol on a wheel which rotates on the premise of betting a game value from a gaming terminal.

What is claimed is:

1. A gaming machine, comprising:
    a wheel having a plurality of symbol arrangement areas in which a plurality of symbols are arranged in a circular arrangement around the wheel, the wheel being capable of rotating in such a manner that the symbols are visible;
    a pointer fixed separately from the rotatable wheel, which pointer points to one of the symbol arrangement areas;
    a plurality of gaming terminals each having a lever for remotely starting rotation of the wheel and a display for displaying a plurality of bet areas with each of the bet areas corresponding to one of the symbols on the wheel, each gaming terminal structured to receive a bet of a game value on one of the bet areas and to award a payout based on odds set for the bet area on which a game value has been bet;
    a lever activating unit which, for each single unit game, activates the lever of one of the gaming terminals based on a predetermined condition while the lever or levers of the other gaming terminal or terminals of the plurality of gaming terminals is/are inactive, the predetermined condition being related to the amount of any game value that has been bet at each of the gaming terminals in the plurality in connection with the single unit game;
    a lever operator notification area associated with each of the plurality of gaming terminals, which, for each said unit game, is activated in association with said one of the plurality of gaming terminals so as to notify a player at said one of the plurality of gaming terminals that that player is able to operate the lever device at said one of the plurality of gaming terminals; and
    a center controller,
    wherein for each single unit game, the center controller executes the processes of:
        (a1) storing, for each gaming terminal, information about on which of the bet areas a game value has been bet and the amount of the game value that has been bet,
        (a2) determining a single resulting symbol from the plurality of symbols,
        (a3) rotating the wheel based on operation of the lever in said one of the plurality of gaming terminals, whose lever has been activated by the lever activating unit,
        (a4) stopping the wheel from being rotated so that the pointer points at one of the symbol arrangement areas with the resulting symbol, and
        (a5) awarding, for each gaming terminal, a payout based on the single resulting symbol and the odds set for the bet area on which the game value has been bet;
    wherein each of the gaming terminals has an operation period measurement device which is able to measure an operation period of the respective lever when the respective lever is operated;
    wherein the center controller rotates the wheel in connection with the single unit game at a rotation speed corresponding to the measured operation period of the lever of said one of the plurality of gaming terminals; and
    wherein for each single unit game the center controller 1) randomly determines an initial rotation speed based on a wheel rotation speed table in which speed levels, each of which corresponds to a measured lever operation time of one gaming terminal, are associated with initial rotation speeds; and 2) starts the rotation of the wheel at the randomly determined initial rotation speed.

2. The gaming machine according to claim 1, wherein
    the center controller compares game values bet at each of the gaming terminals, and
    said predetermined condition based on which the lever of said one of the gaming terminals is activated consists of a greater game value being bet at said one of the gaming terminals than at the rest of the gaming terminals of the plurality.

3. The gaming machine according to claim 1, wherein the lever activating unit prohibits activation of the lever in a given gaming terminal if the amount of game value bet at the given gaming terminal falls short of a predetermined amount.

4. The gaming machine according to claim 2, wherein the lever activating unit prohibits activation of the lever in a given gaming terminal through which a predetermined amount of game value is not bet.

5. The gaming machine according to claim 1, wherein
    said process (a1) includes, during a bet period, storing in a management table said information about on which of the bet areas a game value has been bet and the amount of the game value that has been bet;
    after the bet period, identifying said one of the plurality of gaming terminals and updating in the management table starting-right information associated with said one of the plurality of gaming terminals to indicate that the lever associated with said one of the plurality of gaming terminals is enabled, 1) said one of the plurality of gaming terminals being the gaming terminal at which the greatest total amount has been bet and 2) said predetermined condition based on which the lever of said one of the gaming terminals is activated consisting of a greater game value being bet at said one of the gaming terminals than at the rest of the gaming terminals of the plurality; and said process (a2) includes determining said resulting symbol from the plurality of symbols in response to a game-play initiation command received from the lever, which has been enabled, at said one of the plurality of gaming terminals.

6. The gaming machine according to claim 1, further comprising a motor which rotates the wheel.

7. The gaming machine according to claim 1, wherein
a plurality of stop positions are provided in each of the symbol arrangement areas; and
the center controller randomly selects one of the stop positions in the symbol arrangement area where the resulting symbol is arranged and stops the rotation of the wheel so that the pointer points to the randomly selected stop position.

8. A gaming machine, comprising:
a wheel having a plurality of symbol arrangement areas in which a plurality of symbols are arranged in a circular arrangement around the wheel, the wheel being capable of rotating in such a manner that the symbols are visible;
a pointer fixed separately from the rotatable wheel, which pointer points to one of the symbol arrangement areas;
a motor which rotates the wheel;
a plurality of gaming terminals each having a lever for remotely starting rotation of the wheel and a display for displaying a plurality of bet areas with each of the bet areas corresponding to one of the symbols on the wheel, each gaming terminal structured to receive a bet of a game value on one of the bet areas and to award a payout based on odds set for the bet area on which a game value has been bet;
a lever activating unit which, for each single unit game, activates the lever of one of the gaming terminals based on a predetermined condition while the lever or levers of the other gaming terminal or terminals of the plurality of gaming terminals is/are inactive, the predetermined condition being related to the amount of any game value that has been bet at each of the gaming terminals in the plurality in connection with the single unit game;
a lever operator notification area associated with each of the plurality of gaming terminals, which, for each said unit game, is activated in association with said one of the plurality of gaming terminals so as to notify a player at said one of the plurality of gaming terminals that that player is able to operate the lever device at said one of the plurality of gaming terminals;
a rotation speed data storage which stores therein rotation speed data regulating the rotation speed of the wheel relative to the rotation angle of the wheel; and
a center controller,
wherein for each single unit game, the center controller executes the processes of:
(b1) storing, for each gaming terminal, information about on which of the bet areas a game value has been bet and the amount of the game value that has been bet,
(b2) determining a single resulting symbol from the plurality of symbols,
(b3) rotating the wheel based on operation of the lever in said one of the plurality of gaming terminals, whose lever has been activated by the lever activating unit,
(b4) controlling the motor to change the rotation speed of the wheel based on the rotation speed data stored in the rotation speed data storage;
(b5) stopping the wheel from being rotated so that the pointer points at one of the symbol arrangement areas with the resulting symbol, and
(b6) awarding, for each gaming terminal, a payout based on the single resulting symbol and the odds set for the bet area on which the game value has been bet;
wherein each of the gaming terminals has an operation period measurement device which is able to measure an operation period of the respective lever when the respective lever is operated;
wherein the center controller rotates the wheel in connection with the single unit game at a rotation speed corresponding to the measured operation period of the lever of said one of the plurality of gaming terminals; and
wherein for each single unit game the center controller 1) randomly determines an initial rotation speed based on a wheel rotation speed table in which speed levels, each of which corresponds to a measured lever operation time of one gaming terminal, are associated with initial rotation speeds; and 2) starts the rotation of the wheel at the randomly determined initial rotation speed.

9. The gaming machine according to claim 8, wherein: the rotation speed data regulates the rotation speed so that the rotation is accelerated or decelerated relative to the rotation angle within a predetermined period; and the center controller controls the motor to accelerate or decelerate the rotation of the wheel based on the rotation speed data stored in the rotation speed data storage.

10. The gaming machine according to claim 9, wherein: the center controller controls the motor to rapidly decelerate the rotation of the wheel and then gradually decelerate the rotation of the wheel to stop the wheel, based on the rotation speed data stored in the rotation speed data storage.

11. The gaming machine according to claim 8, wherein
said process (b1) includes, during a bet period, storing in a management table said information about on which of the bet areas a game value has been bet and the amount of the game value that has been bet;
after the bet period, identifying said one of the plurality of gaming terminals and updating in the management table starting-right information associated with said one of the plurality of gaming terminals to indicate that the lever associated with said one of the plurality of gaming terminals is enabled, 1) said one of the plurality of gaming terminals being the gaming terminal at which the greatest total amount has been bet and 2) said predetermined condition based on which the lever of said one of the gaming terminals is activated consisting of a greater game value being bet at said one of the gaming terminals than at the rest of the gaming terminals of the plurality; and
said process (b2) includes determining said resulting symbol from the plurality of symbols in response to a game-play initiation command received from the lever, which has been enabled, at said one of the plurality of gaming terminals.

12. The gaming machine according to claim 8, wherein
a plurality of stop positions are provided in each of the symbol arrangement areas; and the center controller randomly selects one of the stop positions in the symbol arrangement area where the resulting symbol is arranged and stops the rotation of the wheel so that the pointer points to the randomly selected stop position.

13. A gaming machine, comprising:
a wheel having a plurality of symbol arrangement areas in which a plurality of symbols are arranged in a circular arrangement around the wheel, the wheel being capable of rotating in such a manner that the symbols are visible;
a pointer fixed separately from the rotatable wheel, which pointer points to one of the symbol arrangement areas;
a symbol lighting device which lights up the symbols;
a plurality of gaming terminals each having a lever for remotely starting rotation of the wheel and a display for displaying a plurality of bet areas with each of the bet areas corresponding to one of the symbols on the wheel, each gaming terminal structured to receive a bet of a game value on one of the bet areas and to award a payout based on odds set for the bet area on which a game value has been bet;
a lever activating unit which, for each single unit game, activates the lever of one of the gaming terminals based on a predetermined condition while the lever or levers of the other gaming terminal or terminals of the plurality of gaming terminals is/are inactive, the predetermined condition being related to the amount of any game value that has been bet at each of the gaming terminals in the plurality in connection with the single unit game;
a lever operator notification area associated with each of the plurality of gaming terminals, which, for each said unit game, is activated in association with said one of the plurality of gaming terminals so as to notify a player at said one of the plurality of gaming terminals that that player is able to operate the lever device at said one of the plurality of gaming terminals; and
a center controller,
wherein for each single unit game, the center controller executes the processes of:
(c1) storing, for each gaming terminal, information about on which of the bet areas a game value has been bet and the amount of the game value that has been bet,
(c2) determining a single resulting symbol from the plurality of symbols,
(c3) rotating the wheel based on operation of the lever in said one of the plurality of gaming terminals, whose lever has been activated by the lever activating unit, and lighting up all the symbols by the symbol lighting device,
(c4) stopping the wheel from being rotated so that the pointer points at the symbol arrangement area with the resulting symbol, and lighting up only the resulting symbol by the symbol lighting device, and
(c5) awarding, for each gaming terminal, a payout based on the single resulting symbol and the odds set for the bet area on which the game value has been bet;
wherein each of the gaming terminals has an operation period measurement device which is able to measure an operation period of the respective lever when the respective lever is operated;
wherein the center controller rotates the wheel in connection with the single unit game at a rotation speed corresponding to the measured operation period of the lever of said one of the plurality of gaming terminals; and
wherein for each single unit game the center controller 1) randomly determines an initial rotation speed based on a wheel rotation speed table in which speed levels, each of which corresponds to a measured lever operation time of one gaming terminal, are associated with initial rotation speeds; and 2) starts the rotation of the wheel at the randomly determined initial rotation speed.

14. The gaming machine according to claim 13, wherein
said process (c1) includes, during a bet period, storing in a management table said information about on which of the bet areas a game value has been bet and the amount of the game value that has been bet;
after the bet period, identifying said one of the plurality of gaming terminals and updating in the management table starting-right information associated with said one of the plurality of gaming terminals to indicate that the lever associated with said one of the plurality of gaming terminals is enabled, 1) said one of the plurality of gaming terminals being the gaming terminal at which the greatest total amount has been bet and 2) said predetermined condition based on which the lever of said one of the gaming terminals is activated consisting of a greater game value being bet at said one of the gaming terminals than at the rest of the gaming terminals of the plurality; and
said process (c2) includes determining said resulting symbol from the plurality of symbols in response to a gameplay initiation command received from the lever, which has been enabled, at said one of the plurality of gaming terminals.

15. The gaming machine according to claim 13, further comprising a motor which rotates the wheel.

16. The gaming machine according to claim 13, wherein
a plurality of stop positions are provided in each of the symbol arrangement areas; and
the center controller randomly selects one of the stop positions in the symbol arrangement area where the resulting symbol is arranged and stops the rotation of the wheel so that the pointer points to the randomly selected stop position.

17. A gaming machine, comprising:
a wheel having a plurality of symbol arrangement areas in which a plurality of symbols are arranged in a circular arrangement around the wheel, the wheel being capable of rotating in such a manner that the symbols are visible;
a pointer fixed separately from the rotatable wheel, which pointer points to one of the symbol arrangement areas;
a plurality of gaming terminals each having a lever for remotely starting rotation of the wheel and a display for displaying a plurality of bet areas with each of the bet areas corresponding to one of the symbols on the wheel, each gaming terminal structured to receive a bet of a game value on one of the bet areas and to award a payout based on odds set for the bet area on which a game value has been bet;
a lever activating unit which, for each single unit game, activates the lever of one of the gaming terminals based on a predetermined condition while the lever or levers of the other gaming terminal or terminals of the plurality of gaming terminals is/are inactive, the predetermined condition being related to the amount of any game value that has been bet at each of the gaming terminals in the plurality in connection with the single unit game;
a lever operator notification area associated with each of the plurality of gaming terminals, which, for each said unit game, is activated in association with said one of the plurality of gaming terminals so as to notify a player at said one of the plurality of gaming terminals that that player is able to operate the lever device at said one of the plurality of gaming terminals;

a rotation count table storage which stores a rotation count table regulating the number of rotations of the wheel; and a center controller, wherein for each single unit game, the center controller executes the processes of:
- (d1) storing, for each gaming terminal, information about on which of the bet areas a game value has been bet and the amount of the game value that has been bet,
- (d2) determining a single resulting symbol from the plurality of symbols,
- (d3) rotating the wheel a certain number of times according to the rotation count table stored in the rotation count table storage, based on operation of the lever in said one of the plurality of gaming terminals, whose lever has been activated by the lever activating unit,
- (d4) stopping the wheel from being rotated so that the pointer points at one of the symbol arrangement areas with the resulting symbol, and
- (d5) awarding, for each gaming terminal, a payout based on the single resulting symbol and the odds set for the bet area on which the game value has been bet;

wherein each of the gaming terminals has an operation period measurement device which is able to measure an operation period of the respective lever when the respective lever is operated;

wherein the center controller rotates the wheel in connection with the single unit game at a rotation speed corresponding to the measured operation period of the lever of said one of the plurality of gaming terminals; and wherein for each single unit game the center controller 1) randomly determines an initial rotation speed based on a wheel rotation speed table in which speed levels, each of which corresponds to a measured lever operation time of one gaming terminal, are associated with initial rotation speeds; and 2) starts the rotation of the wheel at the randomly determined initial rotation speed.

18. The gaming machine according to claim 17, wherein said process (d1) includes, during a bet period, storing in a management table said information about on which of the bet areas a game value has been bet and the amount of the game value that has been bet;

after the bet period, identifying said one of the plurality of gaming terminals and updating in the management table starting-right information associated with said one of the plurality of gaming terminals to indicate that the lever associated with said one of the plurality of gaming terminals is enabled, 1) said one of the plurality of gaming terminals being the gaming terminal at which the greatest total amount has been bet and 2) said predetermined condition based on which the lever of said one of the gaming terminals is activated consisting of a greater game value being bet at said one of the gaming terminals than at the rest of the gaming terminals of the plurality; and said process (d2) includes determining said resulting symbol from the plurality of symbols in response to a gameplay initiation command received from the lever, which has been enabled, at said one of the plurality of gaming terminals.

19. The gaming machine according to claim 17, further comprising a motor which rotates the wheel.

20. The gaming machine according to claim 17, wherein a plurality of stop positions are provided in each of the symbol arrangement areas; and the center controller randomly selects one of the stop positions in the symbol arrangement area where the resulting symbol is arranged and stops the rotation of the wheel so that the pointer points to the randomly selected stop position.

21. A gaming machine, comprising:

a wheel having a plurality of symbol arrangement areas in which a plurality of symbols are arranged in a circular arrangement around the wheel, the wheel being capable of rotating in such a manner that the symbols are visible;

a border provided between symbol arrangement areas adjacent to each other;

a pointer fixed separately from the rotatable wheel, which pointer points to one of the symbol arrangement areas;

a speaker which outputs a sound effect;

a plurality of gaming terminals each having a lever for remotely starting rotation of the wheel and a display for displaying a plurality of bet areas with each of the bet areas corresponding to one of the symbols on the wheel, each gaming terminal structured to receive a bet of a game value on one of the bet areas and to award a payout based on odds set for the bet area on which a game value has been bet;

a lever activating unit which, for each single unit game, activates the lever of one of the gaming terminals based on a predetermined condition while the lever or levers of the other gaming terminal or terminals of the plurality of gaming terminals is/are inactive, the predetermined condition being related to the amount of any game value that has been bet at each of the gaming terminals in the plurality in connection with the single unit game;

a lever operator notification area associated with each of the plurality of gaming terminals, which, for each said unit game, is activated in association with said one of the plurality of gaming terminals so as to notify a player at said one of the plurality of gaming terminals that that player is able to operate the lever device at said one of the plurality of gaming terminals; and a center controller, wherein for each single unit game, the center controller executes the processes of:
- (e1) storing, for each gaming terminal, information about on which of the bet areas a game value has been bet and the amount of the game value that has been bet,
- (e2) determining a single resulting symbol from the plurality of symbols,
- (e3) rotating the wheel based on operation of the lever in said one of the plurality of gaming terminals, whose lever has been activated by the lever activating unit,
- (e4) when the pointer passes the border, outputting a sound effect from the speaker based on the rotation angle of the wheel,
- (e5) stopping the wheel from being rotated so that the pointer points at one of the symbol arrangement areas with the resulting symbol,
- (e6) awarding, for each gaming terminal, a payout based on the single resulting symbol and the odds set for the bet area on which the game value has been bet;

wherein each of the gaming terminals has an operation period measurement device which is able to measure an operation period of the respective lever when the respective lever is operated;

wherein the center controller rotates the wheel in connection with the single unit game at a rotation speed corresponding to the measured operation period of the lever of said one of the plurality of gaming terminals; and wherein for each single unit game the center controller 1) randomly determines an initial rotation speed based on a wheel rotation speed table in which speed levels, each of which corresponds to a measured lever operation time of one gaming terminal, are associated with initial rotation speeds; and 2) starts the rotation of the wheel at the randomly determined initial rotation speed.

22. The gaming machine according to claim 21, wherein
said process (e1) includes, during a bet period, storing in a management table said information about on which of the bet areas a game value has been bet and the amount of the game value that has been bet;

after the bet period, identifying said one of the plurality of gaming terminals and updating in the management table starting-right information associated with said one of the plurality of gaming terminals to indicate that the lever associated with said one of the plurality of gaming terminals is enabled, 1) said one of the plurality of gaming terminals being the gaming terminal at which the greatest total amount has been bet and 2) said predetermined condition based on which the lever of said one of the gaming terminals is activated consisting of a greater game value being bet at said one of the gaming terminals than at the rest of the gaming terminals of the plurality; and said process (e2) includes determining said resulting symbol from the plurality of symbols in response to a gameplay initiation command received from the lever, which has been enabled, at said one of the plurality of gaming terminals.

23. The gaming machine according to claim 21, further comprising a motor which rotates the wheel.

24. The gaming machine according to claim 21, wherein
a plurality of stop positions are provided in each of the symbol arrangement areas; and
the center controller randomly selects one of the stop positions in the symbol arrangement area where the resulting symbol is arranged and stops the rotation of the wheel so that the pointer points to the randomly selected stop position.

25. A gaming machine, comprising:
a wheel having a plurality of symbol arrangement areas in which a plurality of symbols are arranged in a circular arrangement around the wheel, the wheel being capable of rotating in such a manner that the symbols are visible;
a pointer fixed separately from the rotatable wheel, which pointer points to one of the symbol arrangement areas;
a pointer lighting device which lights up the pointer;
a plurality of gaming terminals each having a lever for remotely starting rotation of the wheel and a display for displaying a plurality of bet areas with each of the bet areas corresponding to one of the symbols on the wheel, each gaming terminal structured to receive a bet of a game value on one of the bet areas and to award a payout based on odds set for the bet area on which a game value has been bet;
a lever activating unit which, for each single unit game, activates the lever of one of the gaming terminals based on a predetermined condition while the lever or levers of the other gaming terminal or terminals of the plurality of gaming terminals is/are inactive, the predetermined condition being related to the amount of any game value that has been bet at each of the gaming terminals in the plurality in connection with the single unit game;
a lever operator notification area associated with each of the plurality of gaming terminals, which, for each said unit game, is activated in association with said one of the plurality of gaming terminals so as to notify a player at said one of the plurality of gaming terminals that that player is able to operate the lever device at said one of the plurality of gaming terminals; and
a center controller,
wherein for each single unit game, the center controller executes the processes of:
(f1) storing, for each gaming terminal, information about on which of the bet areas a game value has been bet and the amount of the game value that has been bet,
(f2) determining a single resulting symbol from the plurality of symbols,
(f3) rotating the wheel and lighting up the pointer by the pointer lighting device, based on operation of the lever in said one of the plurality of gaming terminals, whose lever has been activated by the lever activating unit,
(f4) stopping the wheel from being rotated so that the pointer points at one of the symbol arrangement areas with the resulting symbol, and
(f5) awarding, for each gaming terminal, a payout based on the single resulting symbol and the odds set for the bet area on which the game value has been bet;
wherein each of the gaming terminals has an operation period measurement device which is able to measure an operation period of the respective lever when the respective lever is operated;
wherein the center controller rotates the wheel in connection with the single unit game at a rotation speed corresponding to the measured operation period of the lever of said one of the plurality of gaming terminals; and
wherein for each single unit game the center controller 1) randomly determines an initial rotation speed based on a wheel rotation speed table in which speed levels, each of which corresponds to a measured lever operation time of one gaming terminal, are associated with initial rotation speeds; and 2) starts the rotation of the wheel at the randomly determined initial rotation speed.

26. The gaming machine according to claim 25, wherein
said process (f1) includes, during a bet period, storing in a management table said information about on which of the bet areas a game value has been bet and the amount of the game value that has been bet;

after the bet period, identifying said one of the plurality of gaming terminals and updating in the management table starting-right information associated with said one of the plurality of gaming terminals to indicate that the lever associated with said one of the plurality of gaming terminals is enabled, 1) said one of the plurality of gaming terminals being the gaming terminal at which the greatest total amount has been bet and 2) said predetermined condition based on which the lever of said one of the gaming terminals is activated consisting of a greater game value being bet at said one of the gaming terminals than at the rest of the gaming terminals of the plurality; and said process (f2) includes determining said resulting symbol from the plurality of symbols in response to a gameplay initiation command received from the lever, which has been enabled, at said one of the plurality of gaming terminals.

27. The gaming machine according to claim 25, further comprising a motor which rotates the wheel.

28. The gaming machine according to claim 25, wherein
a plurality of stop positions are provided in each of the symbol arrangement areas; and
the center controller randomly selects one of the stop positions in the symbol arrangement area where the resulting symbol is arranged and stops the rotation of the wheel so that the pointer points to the randomly selected stop position.

* * * * *